(12) United States Patent
Achterberg et al.

(10) Patent No.: US 12,606,388 B2
(45) Date of Patent: Apr. 21, 2026

(54) SWITCH-ON UNIT IN A LINEAR TRANSPORT SYSTEM

(71) Applicant: BECKHOFF AUTOMATION GMBH, Verl (DE)

(72) Inventors: Jan Achterberg, Duisburg (DE); Andreas Brinker, Bakum (DE); Manuel Bettenworth, Vienna (AT); Thomas Vorbohle, Rietberg (DE)

(73) Assignee: Beckhoff Automation GmbH, Verl (DE)

( * ) Notice: Subject to any disclaimer, the term of this patent is extended or adjusted under 35 U.S.C. 154(b) by 868 days.

(21) Appl. No.: 17/961,271

(22) Filed: Oct. 6, 2022

(65) Prior Publication Data

US 2023/0044922 A1 Feb. 9, 2023

Related U.S. Application Data

(63) Continuation of application No. PCT/EP2021/060348, filed on Apr. 21, 2021.

(30) Foreign Application Priority Data

Apr. 21, 2020 (DE) ..................... 10 2020 110 795.1

(51) Int. Cl.
| | |
|---|---|
| *B65G 54/02* | (2006.01) |
| *B60L 13/03* | (2006.01) |

(Continued)

(52) U.S. Cl.
CPC .............. *B65G 54/02* (2013.01); *B60L 13/03* (2013.01); *B65G 17/12* (2013.01); *H02K 11/35* (2016.01);

(Continued)

(58) Field of Classification Search
CPC ........ B65G 54/02; B65G 35/06; B65G 13/08; B65G 17/32; B65G 17/12; H02K 41/031;

(Continued)

(56) References Cited

U.S. PATENT DOCUMENTS

| | | |
|---|---|---|
| 4,836,344 A | 6/1989 | Bolger |
| 5,927,657 A | 7/1999 | Takasan et al. |

(Continued)

FOREIGN PATENT DOCUMENTS

| | | |
|---|---|---|
| AT | 520088 A4 | 1/2019 |
| DE | 3150380 A1 | 7/1983 |

(Continued)

OTHER PUBLICATIONS

"EtherCAT—the Ethernet Fieldbus," EtherCAT Technology Group, Nov. 2012, 21 pages.

(Continued)

*Primary Examiner* — Zachary L Kuhfuss
(74) *Attorney, Agent, or Firm* — Dorsey & Whitney LLP

(57) ABSTRACT

A switch-on unit for a tool of a movable unit of a linear transport system can be fastened to the movable unit. The switch-on unit includes a housing, an energy-receiving coil with energy-receiving electronics, and a movable antenna with communication electronics. The energy-receiving electronics and the communication electronics are disposed on at least a first circuit board within the housing. The housing has an opening for connections of the tool and an installation space for application electronics. A first circuit board has a first interface for the application electronics, with a power supply and communication link. The communication electronics are arranged to receive a first data signal via the movable antenna, to calculate a second data signal from (Continued)

information about a data structure of the first data signal and the first data signal, and to provide the second data signal at the communication link.

16 Claims, 19 Drawing Sheets

(51) Int. Cl.
*B65G 17/12* (2006.01)
*H02K 11/35* (2016.01)
*H02K 41/03* (2006.01)

(52) U.S. Cl.
CPC ....... *H02K 41/031* (2013.01); *H02K 2211/03* (2013.01); *Y02T 90/16* (2013.01)

(58) Field of Classification Search
CPC ...... H02K 41/02; H02K 11/215; B60L 13/03; H02P 25/064; H01F 38/14; Y02T 90/16
See application file for complete search history.

(56) References Cited

U.S. PATENT DOCUMENTS

| | | | |
|---|---|---|---|
| 6,089,512 A | 7/2000 | Ansorge et al. | |
| 6,499,701 B1 | 12/2002 | Thornton et al. | |
| 7,232,020 B2 | 6/2007 | Futschek | |
| 7,243,752 B2 | 7/2007 | Green et al. | |
| 8,347,789 B2 | 1/2013 | Wolf et al. | |
| 9,045,291 B2 | 6/2015 | Konrad et al. | |
| 9,079,724 B2 | 7/2015 | Van De Loecht et al. | |
| 9,188,421 B2 | 11/2015 | Prssmeier et al. | |
| 9,555,720 B2 | 1/2017 | Aumann et al. | |
| 9,601,265 B2 | 3/2017 | Sugino et al. | |
| 9,806,647 B2 | 10/2017 | Prüssmeier et al. | |
| 10,173,865 B2 | 1/2019 | Frantzheld et al. | |
| 10,196,073 B2 | 2/2019 | Pruessmeier | |
| 10,926,406 B2 | 2/2021 | Prüssmeier et al. | |
| 11,161,700 B2 | 11/2021 | Weber | |
| 2003/0230941 A1* | 12/2003 | Jacobs | B65G 47/841 |
| | | | 310/12.19 |
| 2009/0085706 A1 | 4/2009 | Baarman et al. | |
| 2011/0302078 A1 | 12/2011 | Failing | |
| 2012/0217816 A1 | 8/2012 | Wang et al. | |
| 2013/0030211 A1 | 1/2013 | Echigo et al. | |
| 2013/0084157 A1 | 4/2013 | Staunton et al. | |
| 2016/0090275 A1 | 3/2016 | Piech et al. | |
| 2019/0047799 A1 | 2/2019 | Spotti | |
| 2019/0097466 A1 | 3/2019 | Floresta et al. | |
| 2021/0046826 A1 | 2/2021 | Prüssmeier et al. | |

FOREIGN PATENT DOCUMENTS

| | | | |
|---|---|---|---|
| DE | 3504753 A1 | 8/1986 | |
| DE | 10147859 A1 | 4/2003 | |
| DE | 102004031580.9 B4 | 2/2007 | |
| DE | 10216422 C5 | 2/2011 | |
| DE | 102010001484 A1 | 9/2011 | |
| DE | 102011004348 A1 | 8/2012 | |
| DE | 102011014887 A1 | 9/2012 | |
| DE | 102011103318 A1 | 12/2012 | |
| DE | 102012201059 A1 | 7/2013 | |
| DE | 102012103378 A1 | 10/2013 | |
| DE | 102013110341 A1 | 3/2014 | |
| DE | 102013108767 A1 | 2/2015 | |
| DE | 102014100636 A1 | 7/2015 | |
| DE | 102015102236 A1 | 8/2016 | |
| DE | 102015116808.1 B3 | 1/2017 | |
| DE | 202017105290.7 U1 | 10/2017 | |
| DE | 102016222806 B3 | 4/2018 | |
| DE | 102018111715 A1 | 11/2019 | |
| EP | 1984203 B1 | 7/2014 | |
| WO | 9631381 A1 | 10/1996 | |

OTHER PUBLICATIONS

Office Action dated Jan. 28, 2021 in connection with German patent application No. 10 2020 110 795.1, 16 pages including English translation.

International Preliminary Report on Patentability dated Apr. 25, 2022 in connection with International patent application No. PCT/EP2021/060348, 25 pages including English translation.

International Search Report and Written Opinion dated Jul. 8, 2021 in connection with International patent application No. PCT/EP2021/060348, 17 pages including English translation.

Examination Report dated May 2, 2019 in connection with German patent application No. 102018111715.9, 25 pages including English machine translation.

International Search Report and Written Opinion dated May 16, 2019 in connection with International Application No. PCT/EP2019/062659, 32 pages including English machine translation.

\* cited by examiner

SWITCH-ON UNIT IN A LINEAR TRANSPORT SYSTEM

CROSS-REFERENCE TO RELATED APPLICATIONS

The present patent application claims the priority of International Patent Application PCT/EP2021/060348, filed on Apr. 21, 2021, titled "Switch-on Unit in a Linear Transport System," which claims the priority of German patent application DE 10 2020 110 795.1, filed on Apr. 21, 2020, titled "Anschalteinheit in einem linearen Transportsystem," each of which are incorporated by reference herein, in the entirety and for all purposes.

FIELD

The present invention relates to a switch-on unit for a tool of a movable unit of a linear transport system, to a movable unit and to a linear transport system.

BACKGROUND

Linear transport systems are known from the prior art. German patent application DE 10 2018 111 715 A1 discloses a linear transport system in which energy and data are exchanged between stationary units and movable units, wherein a tool is arranged at the movable unit and the tool is supplied with energy and may be controlled on the basis of the data.

SUMMARY

The present invention provides an efficient control and/or connection technique for a tool in a linear transport system. The invention further provides a movable unit and a linear transport system which allow for efficient control for a tool.

According to a first aspect, a switch-on unit for a tool of a movable unit of a linear transport system is attachable to the movable unit and comprises a housing, an energy-receiving coil with energy-receiving electronics and a movable antenna with communication electronics. The energy-receiving electronics and the communication electronics are arranged on at least a first circuit board within the housing. The housing comprises at least one opening for connections of the tool and an installation space for application electronics. The at least one first circuit board comprises a first interface for the application electronics with a power supply and a communication connection. The communication electronics are set up to receive a first data signal via the movable antenna, to calculate a second data signal from information about a data structure of the first data signal and the first data signal, and to provide the second data signal available at the communication link.

It may be provided that the energy-receiving electronics and the communication electronics are each arranged on a separate first circuit board.

Such a switch-on unit may be mounted to the movable unit. Since the switch-on unit comprises the installation space for the application electronics, e.g. one manufacturer of the linear transport system may provide the linear transport system including the movable unit and the switch-on unit, while another manufacturer provides a tool for the linear transport system and the application electronics. The application electronics may then be set up to control the tool based on the second data passed over the communication link. The manufacturer of the linear transport system may specify and publish the data structure of the second data, so that the other manufacturer of the tool may provide corresponding application electronics. This allows for a modular design in which a data structure is predefined and a large number of tool manufacturers may provide different tools.

The housing may be opened for this purpose so that a tool manufacturer may access the installation space for the application electronics. This may e.g. be realized with the aid of a cover that may be fastened by screws or a cover that may be fastened by a clip system.

According to a second aspect, a movable unit of a linear transport system with a switch-on unit according to the invention and a fastening option for a tool is provided. The movable unit has track rollers, wherein the track rollers may roll off on a guide rail of the linear transport system. The movable unit comprises a frame, wherein the rollers are arranged at the frame and wherein the switch-on unit is attached to the frame. The fastening option for the tool is also arranged at the frame. With such a movable unit, a tool may be efficiently arranged in a linear transport system.

According to a third aspect, a linear transport system having a movable unit according to the invention is provided. The linear transport system comprises a guide rail for guiding the movable unit, a plurality of stationary units, and a linear motor for driving the movable unit along the guide rail. The linear motor comprises a stator and a rotor, wherein the stator comprises the stationary units, each of which comprises one or a plurality of drive coils. The rotor is arranged at the movable unit and includes one or a plurality of magnets. At least some of the stationary units, in particular all of the stationary units, each comprise one or a plurality of energy-emitting coils and one or a plurality of stationary antennas.

EXAMPLES

In an embodiment, the switch-on unit is set up to use the data structure to control receipt of the first data signal and to use the data structure to calculate the second data required for transmission to the tool. This may allow for efficient data transmission from a stationary unit of the linear transport system to the tool. In particular, the data structure may be part of the first data and transmitted from the stationary unit to the switch-on unit. The switch-on unit may then be set up to select, from the first data, the data that may be used to control communication with the stationary unit and to select the data that is to be passed on to the tool as second data.

In an embodiment of the switch-on unit, application electronics are arranged in the installation space. The application electronics have connections for connecting the application electronics to the first interface. Furthermore, the application electronics have a second interface for a tool connection, the second interface being arranged in the opening of the housing. In this case, the application electronics may also be provided by the manufacturer of the linear transport system. A manufacturer of the tool may then provide a tool embodied to the second interface. The second interface may be embodied to connect the tool and may e.g. comprise plug-connection elements or solder contacts. It may be provided that the application electronics have a plurality of second interfaces for respectively one tool connection for one tool each.

In an embodiment, the application electronics are set up to process the second data signal and to provide at least one voltage and/or data at the second interface on the basis of the second data signal and/or to read out data at the second interface on the basis of the second data signal. In particular, the second data signal may be processed in a control element of the application electronics.

In an embodiment of the switch-on unit, the application electronics are arranged on a second circuit board. This allows for an efficient modular design, wherein different application electronics for different tools may be provided and arranged on the second circuit board. The second circuit board may then be inserted into the installation space. Furthermore, such an arrangement also allows for a tool exchange, in which the second circuit board may or must be exchanged at the same time, if necessary, but otherwise the switch-on unit does not have to be changed. Alternatively, the application electronics may also be arranged on the first circuit board and the first interface may be embodied as conductor tracks of the first circuit board.

In an embodiment of the switch-on unit, the second interface comprises a plug-in element, the plug-in element sealing the opening tightly. The opening is adjusted to the plug-in element so that the plug-in element, e.g. a plug or a socket, may be inserted into the opening and then fastened in such a way that the housing is sealed tightly and thus no more liquids or gases may enter the housing. The housing may further comprise seals that may be used to seal a housing opening during closure. A seal may also be provided on the plug-in element, tightly sealing the opening.

The second interface may therefore be embodied as a plug-in element, wherein non-sealing plug-in elements may also be used. Alternatively, the second interface may be embodied as a clamping, cutting, screw or solder connection.

In an embodiment of the switch-on unit, the housing is cast with a curing liquid. This allows the at least one first circuit board and the application electronics to be fixed within the housing, as well as the energy-receiving coil and the movable antenna. As a result, vibrations and/or accelerations occurring due to a movement of the movable unit in the linear transport system, which could potentially lead to damage to the first circuit board, the application electronics or the energy-receiving coil and the movable antenna, may no longer move the individual elements of the switch-on unit against one another, thus providing a mechanically more stable switch-on unit. Mechanical damage to the switch-on unit due to the movement of the movable unit in the linear transport system is hence reduced. Due to the curing liquid, the individual elements of the switch-on unit are also better protected against liquids and gases.

In an embodiment of the switch-on unit, the application electronics are set up to control a stepper motor and/or a servo motor and/or a DC motor of the tool and/or to control a coil current for a coil of the tool and/or to provide digital inputs and/or outputs and/or to provide analog inputs and/or outputs and/or to provide one or a plurality of communication interfaces and/or to provide one or a plurality of interfaces for a rotary encoder or linear encoder.

In an embodiment of the switch-on unit, the energy-receiving electronics are set up to convert an AC voltage received via the energy-receiving coil into a DC voltage provided via the voltage supply. Contactless energy transmission may essentially only be realized by alternating voltages and not by direct voltages. However, for the application electronics and/or the tool, a provided DC voltage may be more useful. Thus, this embodiment allows for an improved power supply of the application electronics and/or the tool.

In an embodiment of the switch-on unit, the energy-receiving electronics are set up to regulate the DC voltage to a predetermined value. This value may e.g. be 24 volts. 24 volts is suitable as a DC voltage because, on the one hand, lower voltages for electronics may easily be generated from a higher voltage. For the tool, 24 volts DC is sufficient in most cases, as well.

In an embodiment of the switch-on unit, the housing is larger in a first direction of extension than in a second direction of extension. The housing comprises a first region and a second region and is larger in the first region in the second direction of extension than in the second region. The energy-receiving coil and the movable antenna are arranged in the first region. The first circuit board and the installation space extend over the first region and the second region. Such an arrangement of said components allows for efficient and space-saving arrangement of the energy-receiving coil and the movable antenna, energy-receiving electronics and communication electronics and application electronics in the housing.

In an embodiment, the housing is at least partially made of metal. This may provide better protection against mechanical influences. Furthermore, this may improve a heat dissipation capability of the housing, so that e.g. a waste heat of the energy-receiving electronics and/or communication electronics and/or application electronics may be better dissipated from the housing. Thus, the movable unit may simultaneously function as a heat sink. The housing may further include cooling elements, such as cooling fins, to further improve heat dissipation. The energy-receiving coil and the movable antenna, respectively, may be mounted behind a recess of the housing, which recess may be covered by a corresponding sticker.

In an embodiment of the switch-on unit, the metal is aluminum and/or stainless steel. The housing may be embodied with corresponding radii so that guidelines for hygienic design are met. If seals are installed on the housing, they may be made of an appropriately approved plastic. A sticker to cover the energy-receiving coil or movable antenna may also comply with the relevant guidelines.

In an embodiment of the switch-on unit, the switch-on unit comprises a memory. The memory is large enough to store a firmware of the switch-on unit. Further, the switch-on unit is embodied to receive a data packet, wherein the switch-on unit is embodied to perform a firmware update of the switch-on unit upon receipt of the data packet. In order for the memory to be large enough, it may be provided that a memory capacity is typically at least 64 and at most 1024 kilobytes, but other memory capacities are conceivable, as well. This applies in particular to memories that are embodied as flash memories. An EPROM may also comprise a storage capacity of between 2 and 4 megabytes. In particular, as a result, memories with a storage capacity between 64 kilobytes and 4 megabytes may be large enough.

It may be provided that a computing unit of the switch-on unit comprises a special bootloader for carrying out the firmware update, the bootloader being able to read the firmware from the memory and then overwrite the firmware of the computing unit. In order for this process to be reliably executed by the switch-on unit without interruption, the switch-on unit may be set up to first receive the firmware in its entirety after receiving the data packet that initiates the firmware update process, wherein an appropriately large number of data packets may be received for the transmission of the firmware for this purpose. After the switch-on unit has received all the data packets for the firmware and has transferred them completely to an internal memory, the switch-on unit checks whether there is enough energy available in an internal energy memory so that the firmware update may be performed without interruption. The interface then sets its bootloader to a corresponding mode to perform the firmware update and then restarts itself accordingly. The bootloader then takes over the update process and restarts the computing unit after the update.

In an embodiment, the switch-on unit is equipped with a further memory that is large enough to store the firmware of the application electronics. Furthermore, the switch-on unit is set up to receive a further data packet, wherein the switch-on unit is set up to perform a firmware update of the application electronics upon receipt of the further data packet. The further memory may be identical to the memory for the firmware update of the switch-on unit. To ensure that the memory is large enough, it may be provided that a memory capacity is typically at least 64 and at most 1024 kilobytes, but other memory capacities are conceivable, as well. This applies in particular to memories that are embodied as flash memories. An EPROM may also have a storage capacity of between 2 and 4 megabytes. In particular, therefore, memories with a storage capacity between 64 kilobytes and 4 megabytes may be large enough.

Corresponding communication commands are defined in a protocol for the application electronics, which put the application electronics into the mode for receiving new firmware. To ensure that this process is executed by the switch-on unit without interruption, the switch-on unit is set up to first receive the complete firmware after receiving the additional data packet that initiates the firmware update process for the application electronics, wherein a corresponding number of data packets are received for the transmission of the firmware. After the switch-on unit has received all the data packets for the firmware and transferred them completely to an internal memory, the switch-on unit checks whether there is enough energy available in an internal energy memory so that the firmware update may be carried out without interruption. The interface now puts the application electronics into firmware update mode. The firmware is now completely transferred from the internal memory to the application electronics and an update command is then issued.

In an embodiment, the switch-on unit is configured to store the firmware of the switch-on unit or the application electronics in an internal memory. Furthermore, the switch-on unit is set up to subsequently check the received firmware for validity. For this purpose, the switch-on unit may e.g. form a hash sum and check the hash sum by an internally stored certificate.

In an embodiment of the movable unit, a tool is attached to the fastening option. The tool is connected to the switch-on unit.

BRIEF DESCRIPTION OF THE DRAWINGS

The present invention will be discussed in more detail below by means of embodiment examples and with reference to figures. Here, in a schematic illustration in each case

6

Figure 6:
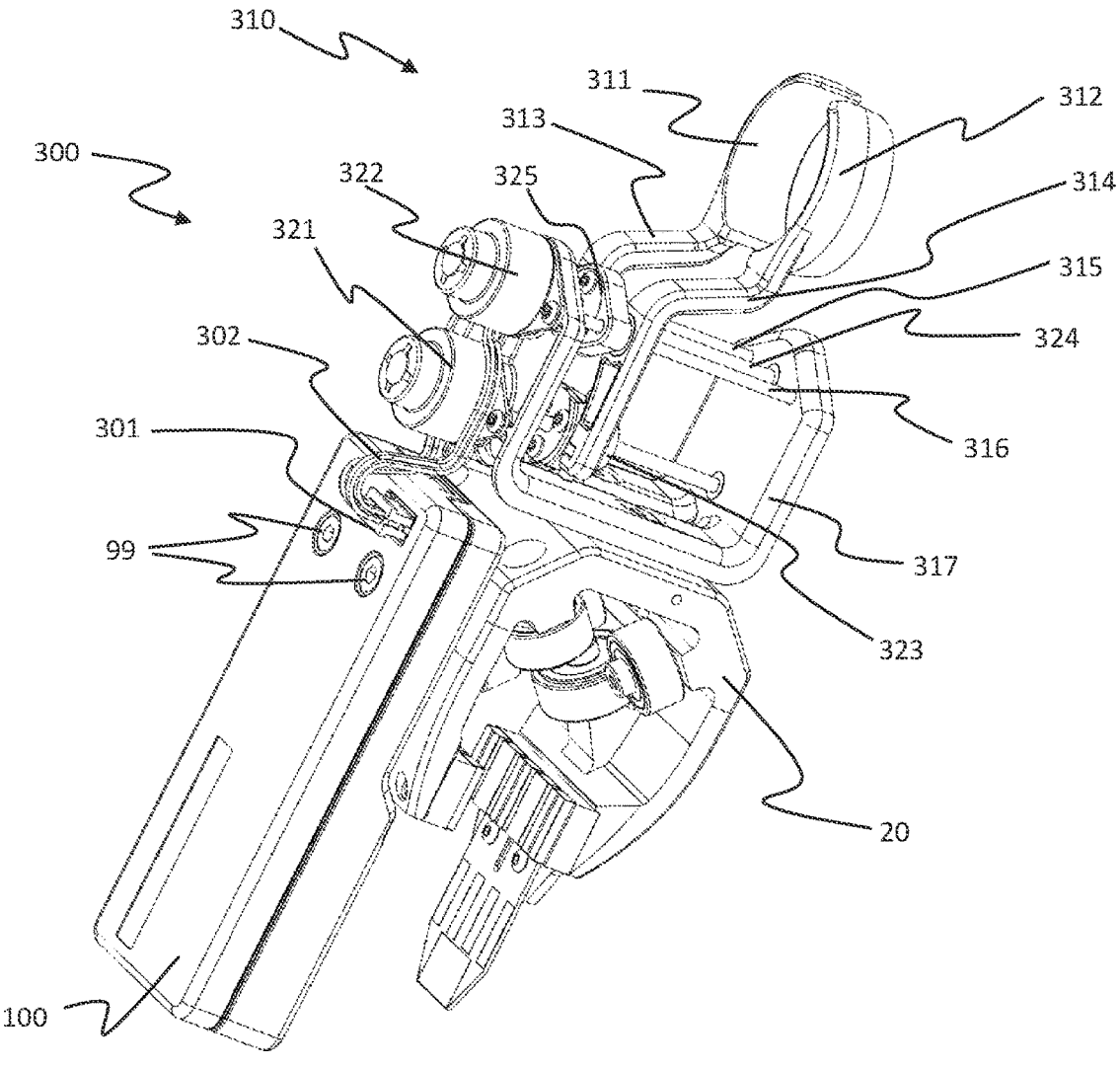
FIG. 6 shows an isometric view of a movable unit with a gripper.
Figure 8:
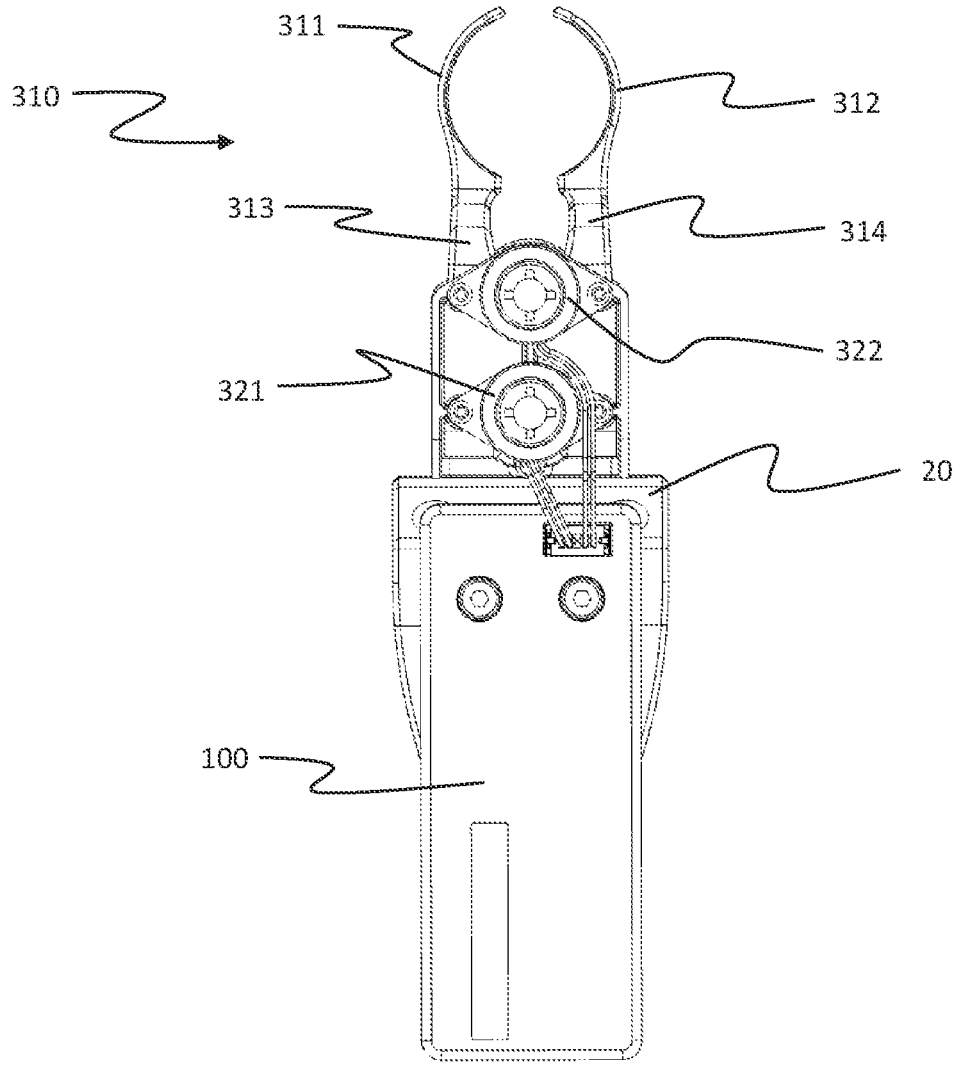
Figure 9:
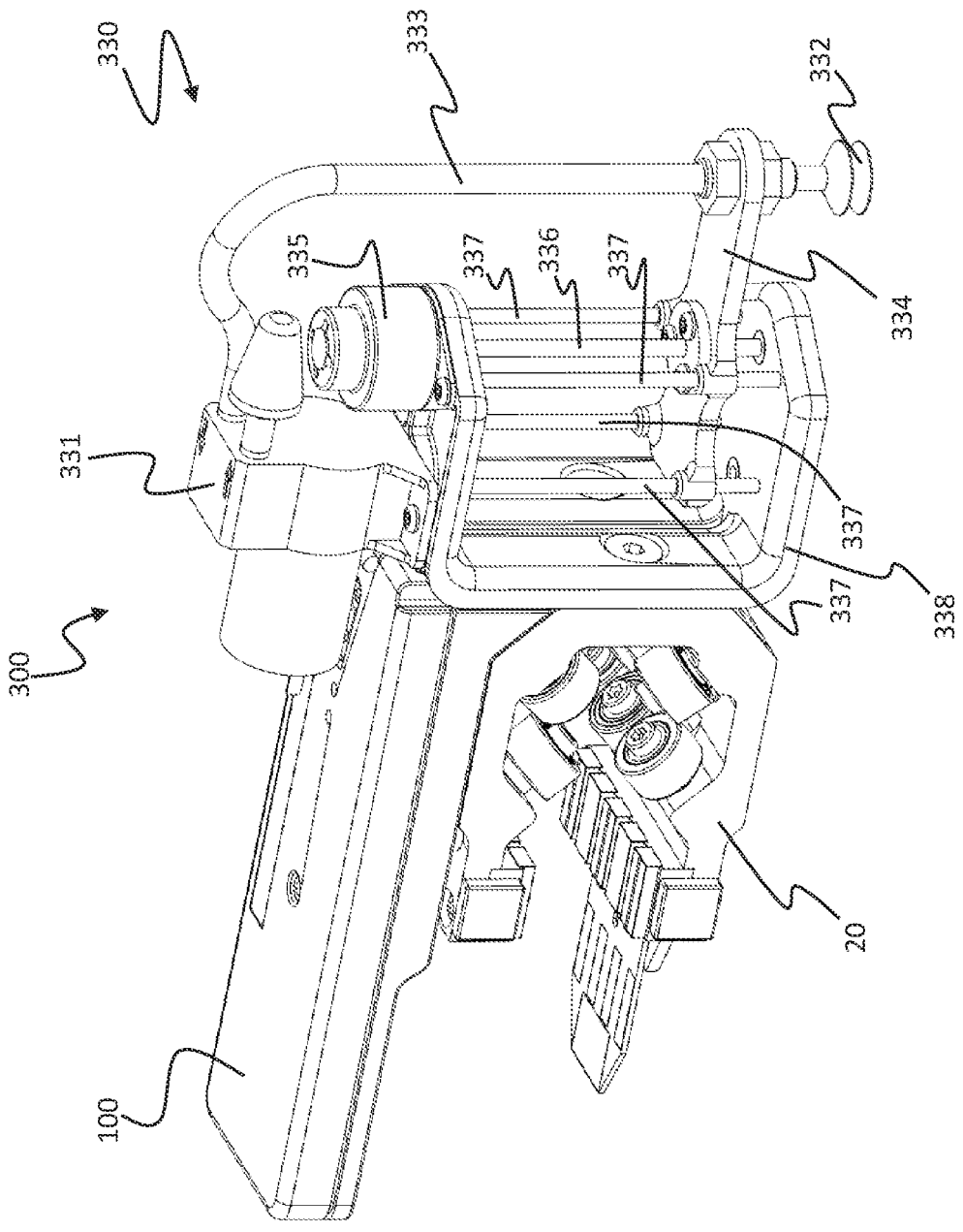
Figure 10:
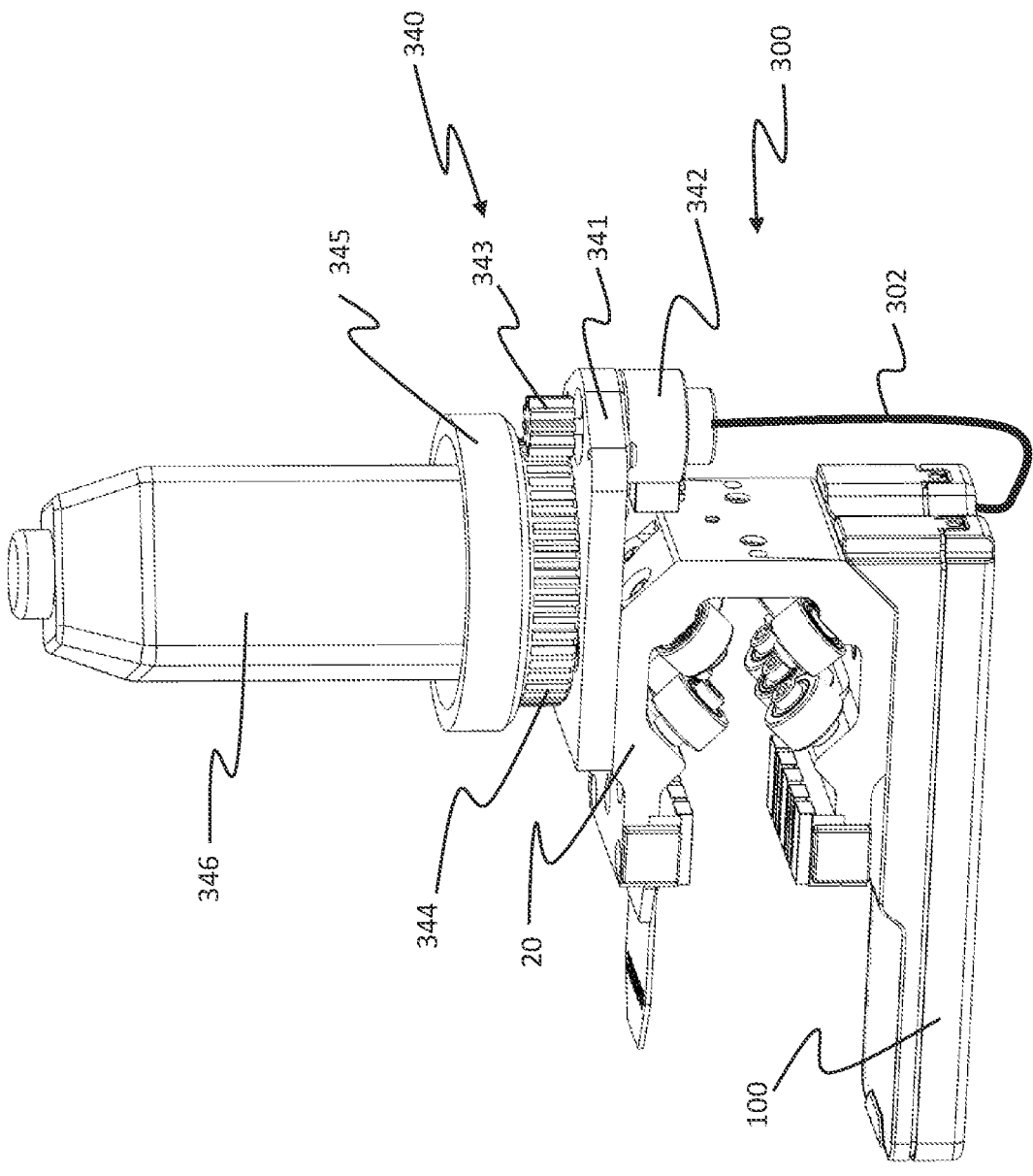

FIG. 8 shows a top view of the movable unit of FIG. 6;

FIG. 9 shows an isometric view of a movable unit with a vacuum lifter;

FIG. 10 shows an isometric view of a movable unit with a rotation unit; and

FIGS. 11 to 19 show various circuits of the application electronics.

DETAILED DESCRIPTION

Figure 1:
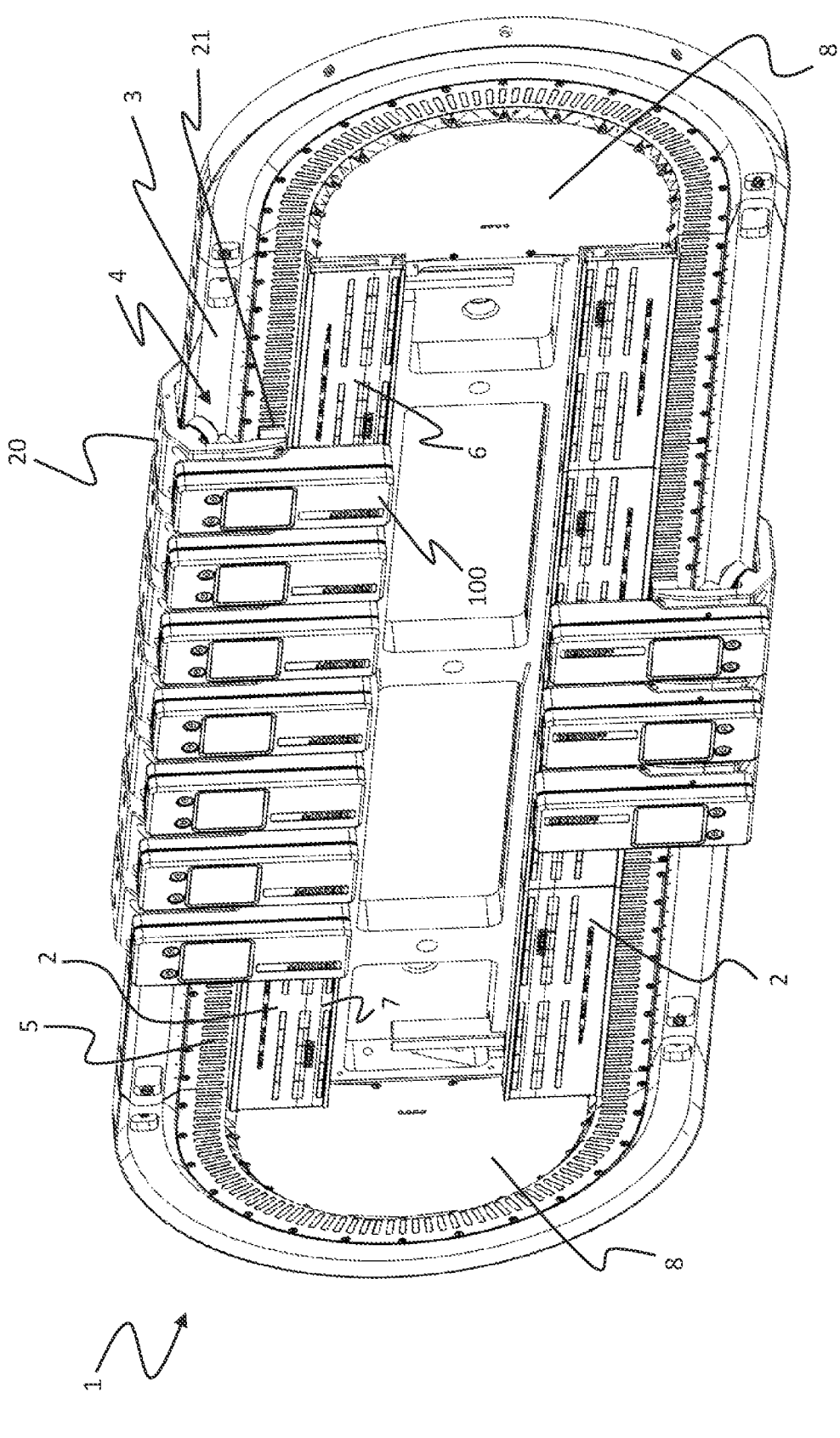
FIG. 1 shows an isometric view of a linear transport system.

FIG. 1 shows an isometric view of a linear transport system 1 having eight stationary units 2, two curved module units 8, ten movable units 20, each with a switch-on unit 100 attached to the respective movable unit 20. In the depicted embodiment example, the linear transport system 1 comprises a circulating guide rail 3 for guiding the movable units 20. The linear transport system 1 may comprise more or less than the one stationary unit 2 shown in FIG. 1. A linear motor 4 for driving the movable units 20 along the guide rail 3 comprises a stator 5 and a rotor 21. The stator 5 is arranged on the stationary units 2 and the curved module units 8, respectively, and comprises one or a plurality of drive coils within the stationary units 2 and the curved module units 8, respectively. The rotor 21 is arranged on the movable unit 20, respectively, and comprises one or a plurality of magnets 22.

As an alternative to the guide rail 3 shown in FIG. 1, recirculating ball bearing guides or sliding guides may also be used to achieve guidance of a movement of the movable units 20.

Figure 2:
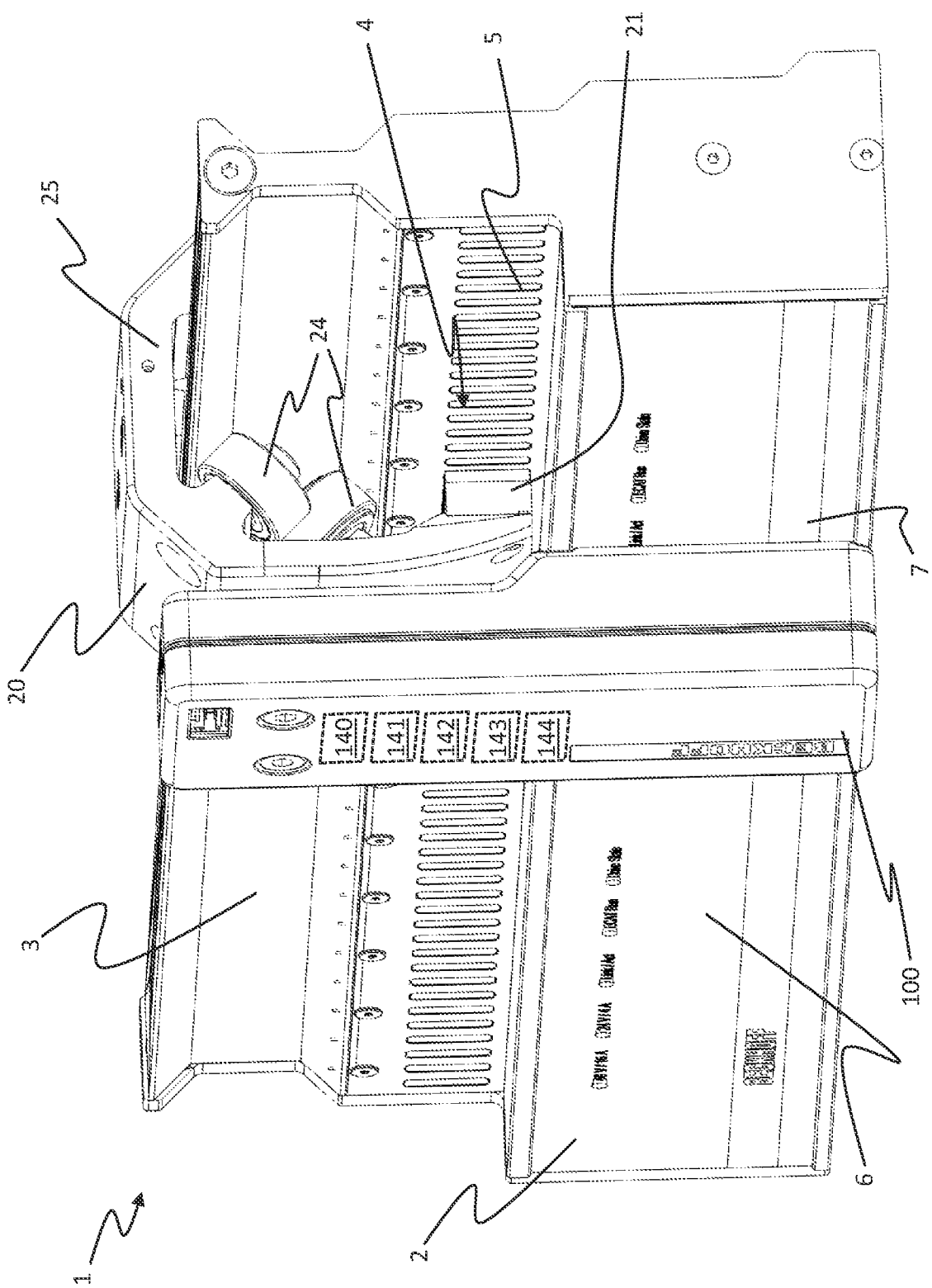
FIG. 2 shows an isometric detailed view of a stationary unit and a movable unit of the linear transport system of FIG. 1.

FIG. 2 shows an isometric detailed view of a stationary unit 2 and a movable unit 20 of the linear transport system 1 shown in FIG. 1. The movable unit 20 has a plurality of track rollers 24, wherein the track rollers 24 may roll off on the guide rail 3 of the linear transport system 1. The movable unit 20 comprises a frame 25, wherein the track rollers 24 are arranged and fastened to the frame 25. The stationary unit 2 comprises, in an area partially covered by the switch-on unit 100, at least one stationary antenna 6 and at least one energy-emitting coil 7.

The switch-on unit 100 comprises an optional computing unit 140, an optional memory 141, an optional further memory 142, an optional internal memory 143, and an optional internal power memory 144. The internal memory 143 may be a volatile memory, such as a random access memory (RAM).

Figure 3:
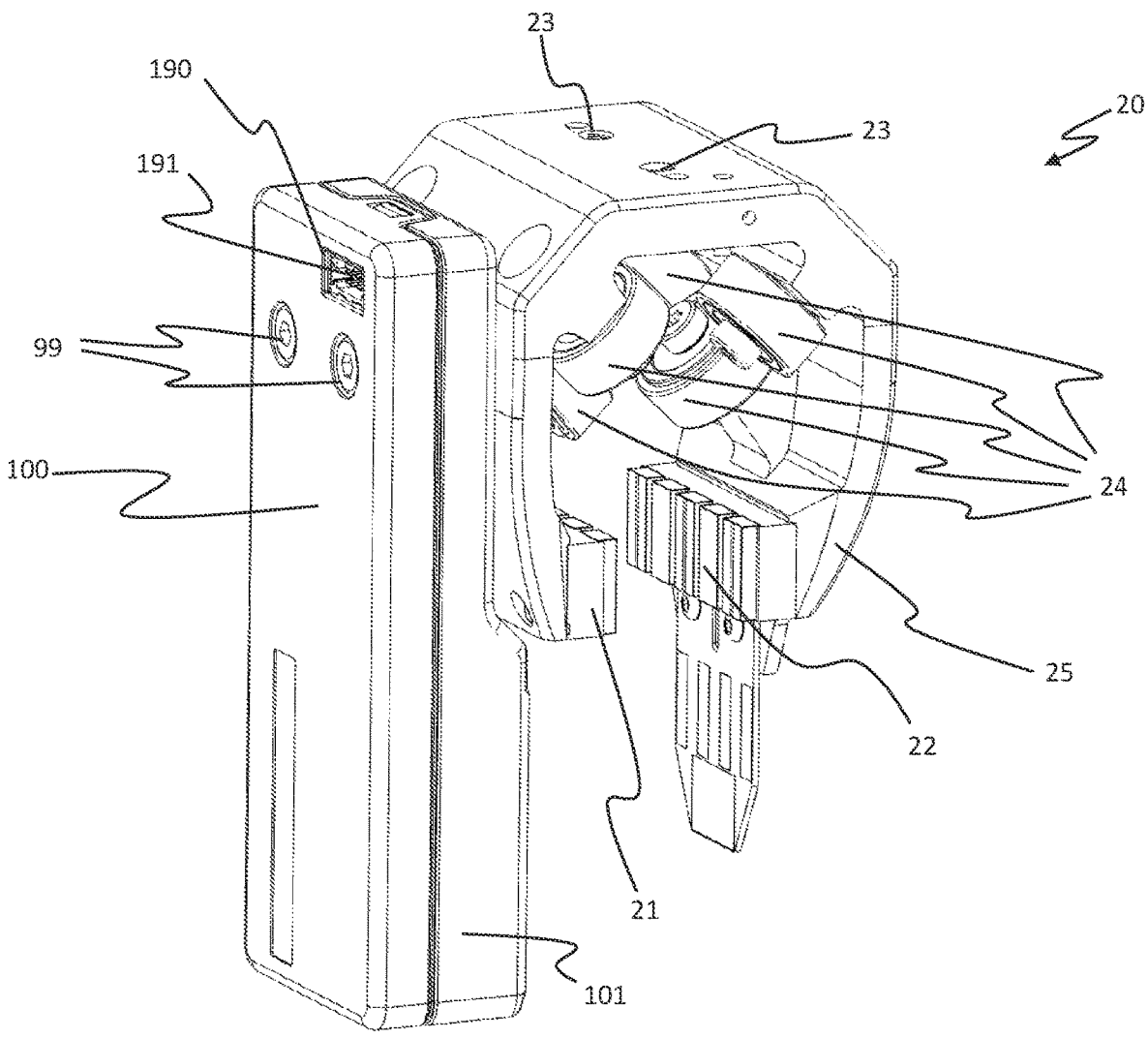
FIG. 3 shows an isometric view of the movable unit of FIG. 2.

FIG. 3 shows an isometric view of the movable unit 20 of FIG. 2 without the stationary unit. The movable unit 20 comprises at least one fastening option 23 for a tool, embodied here as threaded holes. A tool may thus be fastened to the movable unit 20 with the aid of screws or dowel pins, respectively. However, alternatives to threaded holes are also conceivable. Furthermore, fastening options for more than one tool may also be provided. Like the rollers 24, the switch-on unit 100 is also fastened to the frame 25. In this case, the switch-on unit 100 is attached to the movable unit 20 by two screws 99. The switch-on unit 100 has a housing 101 with an opening 190. A plug-in element 191 is arranged in the opening 190. The opening 190 may also be arranged at a different position at the housing 101 than shown in FIG. 3. The housing 101 may comprise a plurality of parts, which are connected to form a housing 101.

Instead of the plug-in element 191, another connection element may also be provided, e.g. solder contacts, screw contacts, plugs or couplings, plug-in terminals or insulation displacement connectors.

Figure 4:
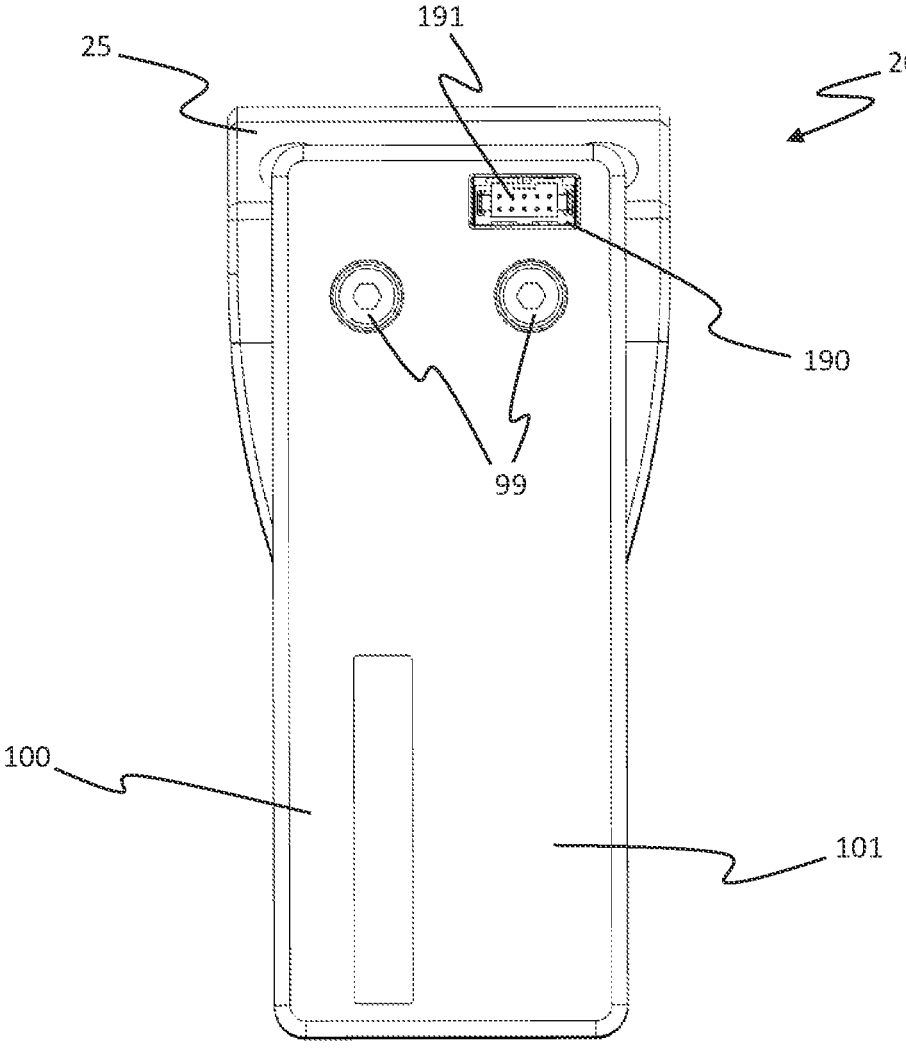
FIG. 4 shows a top view of the movable unit of FIG. 3.

FIG. 4 shows a side view of the movable unit of FIG. 3.

Figure 5:
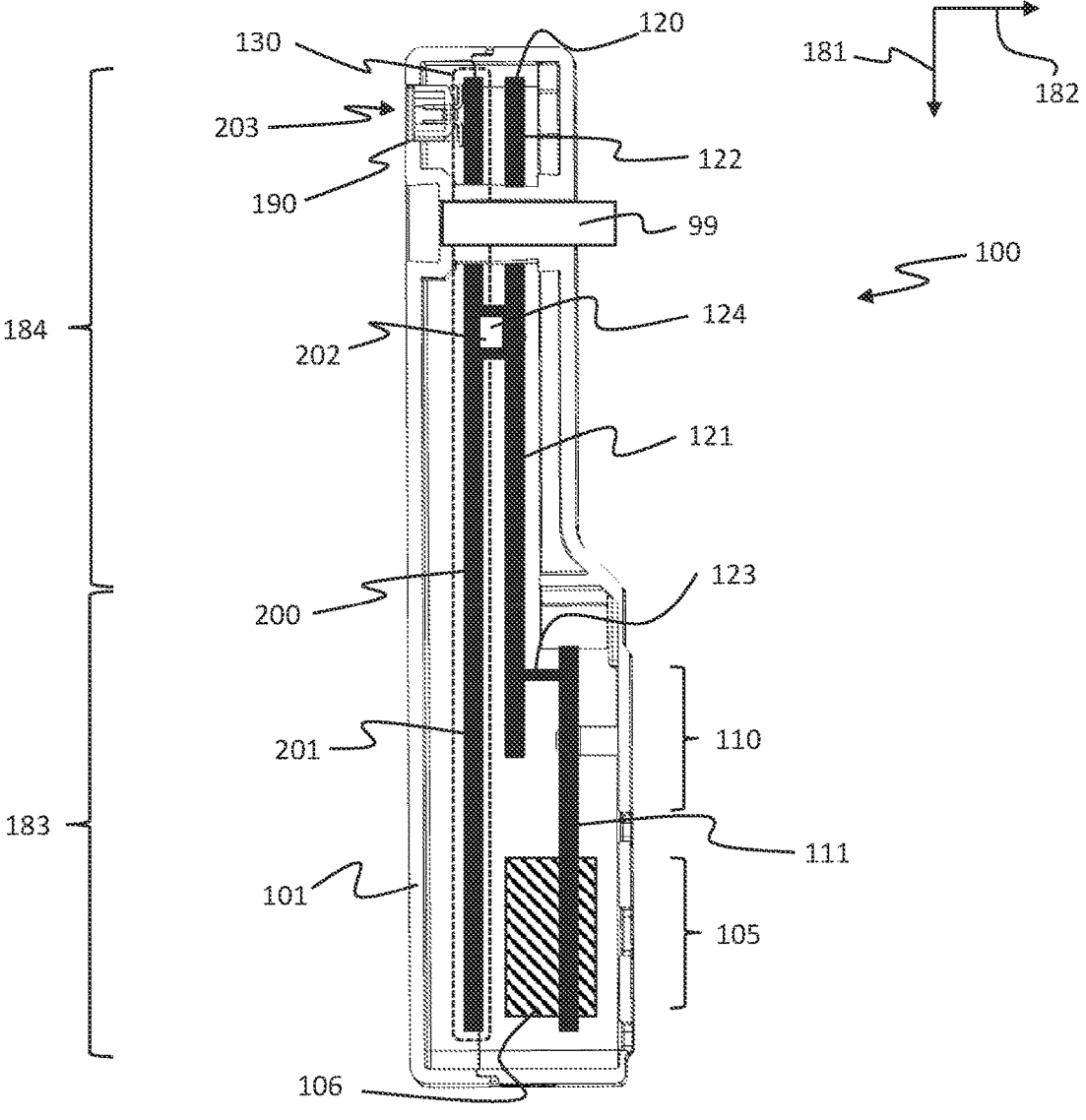
FIG. 5 shows a cross-section through a switch-on unit.

FIG. 5 shows a cross-sectional view of the switch-on unit 100 of FIGS. 1 to 4. The switch-on unit 100 comprises a housing 101. Within the housing 101, an energy-receiving coil 105 with a ferromagnetic core 106 and a movable antenna 110 are arranged in such a way that the energy-receiving coil 105 faces the energy-emitting coil 7 and the movable antenna 110 faces the stationary antenna 6 of FIG. 2. The term movable antenna 110 is intended to clarify that the movable antenna 110 moves together with the movable unit 20. The movable antenna 110 may be arranged in a fixed position relative to the movable unit 20. In the depicted embodiment, the energy-receiving coil 105 and the movable antenna 110 are arranged on a common coil board 111. Alternatively, the energy-receiving coil 105 and the movable antenna 110 may be arranged on separate circuit boards. A first circuit board 120 having an energy-receiving electronics 121 and communication electronics 122 is also arranged within the housing 101 and connected to the coil circuit board 111 via a connection 123, wherein the connection 123 connects the energy-receiving coil 105 to the energy-receiving electronics 121 and the movable antenna 110 to the communication electronics 122. The housing 101 comprises an opening 190 for connections of the tool. Furthermore, the housing 101 comprises an installation space 130 for an application electronics 200.

In FIG. 5, the application electronics 200 is shown in the form of a second circuit board 201. The first circuit board 120 comprises a first interface 124 for the application electronics 200 with a power supply and a communication link. The first interface 124 may be implemented in various ways, e.g. as a plug, a fixed clamp, cut or screw connection, or as soldered conductors. Also, conductor tracks may be arranged on a circuit board if the application electronics 200 are also arranged on the first circuit board 120. The communication electronics 122 is configured to receive a first data signal via the movable antenna 110, to calculate a second data signal from information about a data structure of the first data signal and the first data signal, and to provide the second data signal at the communication link of the interface 124. In this context, it may be provided that a data structure of the second data signal is specified by a manufacturer of the switch-on unit 100, wherein a manufacturer of a tool and the associated application electronics 200 configures the application electronics 200 such that the application electronics 200 may process the second data signal.

In an embodiment example, the application electronics 200 comprises connections 202 for connecting the application electronics 200 to the first interface 124. Further, the application electronics 200 comprises a second interface 203 for a tool connection, wherein the second interface 203 is arranged in the opening 190 of the housing 101. In this regard, the second interface 203 may comprise the plug-in element 191 of FIGS. 3 and 4.

Instead of the second circuit boards 201 shown in FIG. 5, the application electronics 200 may be arranged in the housing 101 without a circuit board.

In an embodiment example, the second interface 203 comprises a plug element, e.g. the plug element 191 of FIGS. 3 and 4, wherein the plug element tightly closes the opening 190. In this case, it may be provided to encapsulate the housing 101 with a curing liquid.

In an embodiment example, the energy-receiving electronics 121 are arranged to convert an AC voltage received via the energy-receiving coil 105 to a DC voltage provided via the power supply of the first interface 124. In this regard, it may be provided to regulate the DC voltage to a predetermined value, such as twenty-four volts. For this purpose, e.g. it may be provided that a voltage supply unit is arranged on the first circuit board 120, which additionally serves to supply voltage to the energy-receiving electronics 121 and the communication electronics 122.

In an embodiment example, as shown in FIG. 5, the housing 101 is larger in a first extension direction 181 than in a second extension direction 182. The housing 101 comprises a first region 183 and a second region 184. The housing 101 is larger in the first region 183 in the second extension direction 182 than in the second region 184. The energy-receiving coil 105 and the movable antenna 110 are arranged in the first region 183. The first circuit board 120 and the installation space 130 extend over the first region 183 and the second region 184. By arranging the energy-receiving coil 105 and the movable antenna 110 in the first region 183, they may be arranged where the housing 101 is larger in the second extension direction 182. This allows for the energy-receiving coil 105 and the movable antenna 110 to be arranged closer to the energy-emitting coil 7 and the stationary antenna 6, respectively, during operation of the linear transport system 1.

In an embodiment example, the switch-on unit 100 comprises an optional memory 141 (as shown in FIG. 2). The memory 141 is large enough to store a firmware of the switch-on unit 100. Furthermore, the switch-on unit 100 is embodied to receive a data packet, wherein the switch-on unit 100 is embodied to perform a firmware update of the switch-on unit 100 upon receiving the data packet.

It may be provided that a computing unit 140 of the switch-on unit 100 includes a special bootloader for executing the firmware update, wherein the bootloader is capable of reading the firmware from the memory 141 and subsequently overwriting the firmware of the computing unit 140. In order to ensure that this process is carried out by the switch-on unit 100 without interruption, the switch-on unit 100 may be configured to first receive the firmware in its entirety after receiving the data packet that initiates the firmware update process, wherein a corresponding number of data packets for transferring the firmware may be received for this purpose. After the switch-on unit 100 has received all the data packets for the firmware and has transferred them completely to an internal memory 143, the switch-on unit 100 checks whether there is enough energy available in an internal energy memory 144 so that the firmware update may be carried out without interruption. The switch-on unit 100 then puts its bootloader into an appropriate mode to perform the firmware update and then reboots itself accordingly. The bootloader then takes over the update process and restarts the computing unit 140 after the update.

In an embodiment example, the switch-on unit 100 is provided with an optional further memory 142 that is large enough to store the firmware of the application electronics 200. Furthermore, the switch-on unit 100 is configured to receive a further data packet, wherein the switch-on unit 100 is configured to perform a firmware update of the application electronics 200 upon receipt of the further data packet. The further memory 142 may be identical to the memory 141 for the firmware update of the switch-on unit 100.

Corresponding communication commands are defined in a protocol for the application electronics 200, which put the application electronics 200 into the mode for receiving new firmware. To ensure that this process is executed by the switch-on unit 100 without interruption, the switch-on unit 100 is set up, after receiving the further data packet that initiates the process of updating the firmware of the application electronics 200, to first receive the firmware completely, wherein a corresponding number of data packets are received for the transmission of the firmware. After the switch-on unit 100 has received all the data packets for the firmware and has transferred them completely to an internal memory 143, the switch-on unit 100 checks whether there is enough energy available in an internal energy memory 144 so that the firmware update may be executed without interruption. Now, the switch-on unit 100 puts the application electronics 200 into a mode for the firmware update. The firmware is now completely transferred from the internal memory 143 to the application electronics 200 and then a command to update is issued.

In an embodiment of the switch-on unit 100, the switch-on unit 100 is configured to store the firmware of the switch-on unit 100 or the application electronics 200 in an internal memory 143. Furthermore, the switch-on unit 100 is configured to subsequently check the received firmware for validity. For this purpose, the switch-on unit 100 may e.g. form a hash sum and check the hash sum with the aid of an internal stored certificate.

The firmware of the application electronics and/or the firmware of the switch-on unit may comprise travel profiles of the movable units 20 or tables, which are transmitted in advance as a larger data structure.

FIG. 6 shows an isometric view of a movable unit 20 with a switch-on unit 100 and a tool 300. The tool 300 is embodied as a gripper 310. The gripper 310, i.e. the tool 300, is connected to the switch-on unit 100 via a plug 301 and a cable 302.

The gripper 310 comprises a first gripper shell 311 and a second gripper shell 312. The first gripper shell 311 is arranged on a first motion converter 313. The second gripper shell 312 is arranged on a second motion converter 314. The first motion converter 313 is rotatable about a first axis rod 315. The second motion converter 314 is rotatable about a second axis rod 316. The two axis rods 315, 316 are attached to a gripper frame 317. The first axis rod 315 and the second axis rod 316 are arranged in parallel to each other. An opening and a closing of the two gripper shells 311, 312, respectively, may be carried out by an opposite movement of the first motion converter 313 around the first axis rod 315 and of the second motion converter 314 and the second axis rod 316. For this purpose, the gripper 310 comprises a first motor 321 arranged on the gripper frame 317. The first motor 321 may shift a conical body 323 parallel to the axis rods 315, 316. Via a spring, a force may thereby be exerted on the two motion converters 313, 314, wherein the two motion converters 313, 314 are thereby in contact with the conical body 323 and a movement of the conical body 323 parallel to the two axis rods 315, 316 triggers a rotation of the two motion converters 313, 314 about the two corresponding axis rods 315, 316, so that the two gripper shells 311, 312 are opened or closed. Alternatively, another mechanical mechanism may be provided to open or close the two gripper shells 311, 312.

The gripper 310 further comprises a second motor 322 which may rotate a threaded rod 324 arranged in the region of the two axis rods 315, 316 and which is also arranged on the gripper frame 317. Instead of the threaded rod 324, a spindle may be used in other embodiments. A lifting unit 325 comprises an internal thread that the threaded rod 324 engages with. A rotation of the threaded rod 324 thereby moves the lifting unit 325 in parallel to the two axis rods 315, 316. The first motion converter 313 and the second motion converter 314 are connected to the lifting unit 325 in such a way that a movement of the lifting unit 325 in parallel to the two axis rods 315, 316 also moves the two gripper shells 311, 312 in parallel to the two axis rods 315, 316.

The switch-on unit 100 and in particular the application electronics 200 in the switch-on unit 100 may be set up to control the first motor 321 and the second motor 322 on the basis of received data, e.g. by applying a voltage to the first motor 321 and/or the second motor 322 by the switch-on unit 100 via the plug-in element 191 and the plug 301. The tool 300 may be attached to the fastening options 23 of the movable unit 20. The fastening options 23 may be embodied as explained in FIG. 3.

Figure 7:
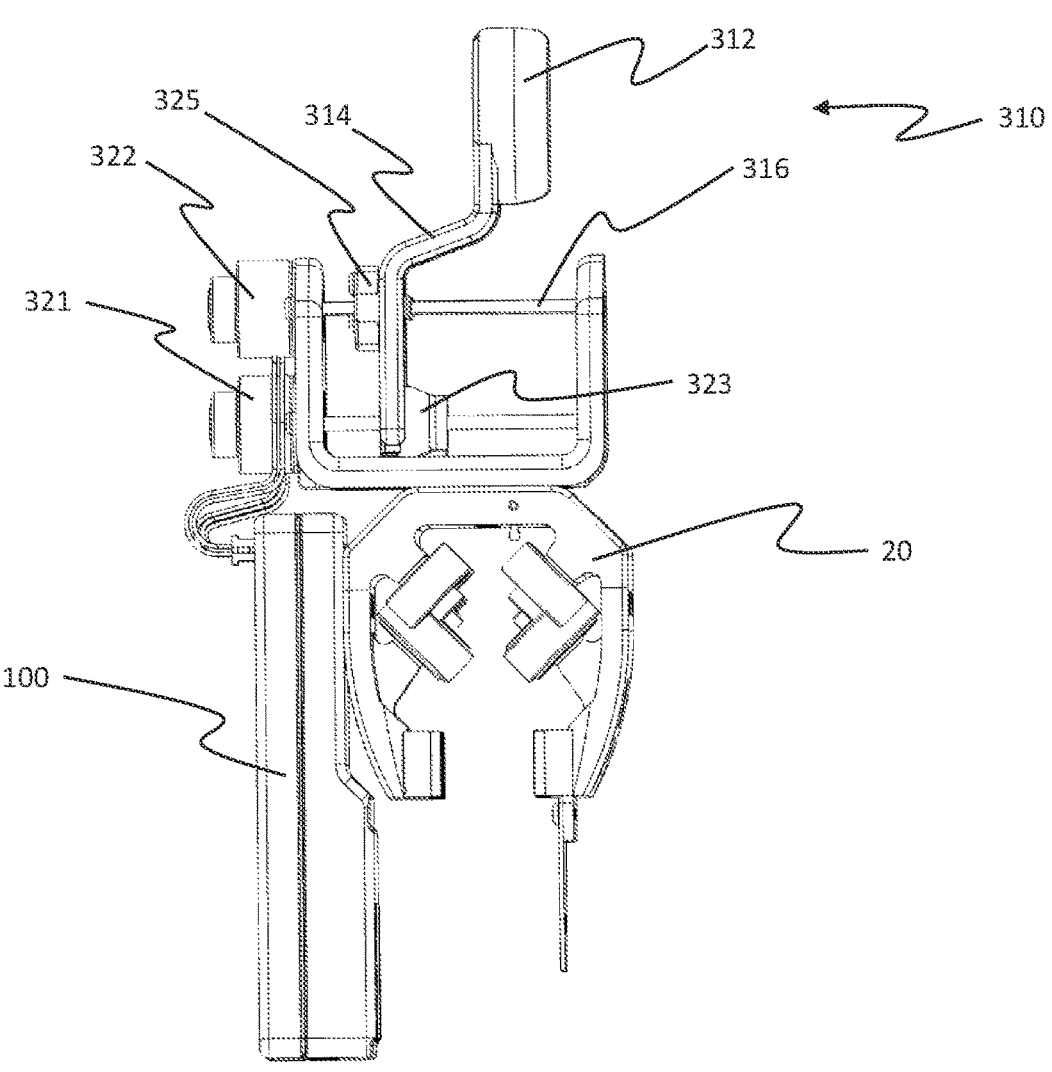
FIG. 7 shows a side view of the movable unit of FIG. 6.

FIG. 7 shows a side view of the movable unit 20 of FIG. 6. In particular, the conical body 323 is more visible in this view. If the conical body 323 is moved in a direction parallel to the two axis rods 315, 316 (in FIG. 7, only the second axis rod 316 is visible due to the perspective), the two motion converters 313, 314 may be rotated relative to each other about the two axis rods 315, 316, thus opening or closing the two gripper shells 311, 312.

FIG. 8 shows a top view of the movable unit 20 of FIGS. 6 and 7. With the aid of the first motor 321, the two gripper shells 311, 312 may be opened or closed. With the second motor 322, the two gripper shells 311, 312 may be moved out of the drawing plane or into the drawing plane.

The switch-on unit 100 of FIGS. 6 to 8 may comprise application electronics 200 that are arranged to output voltages for two motors. Alternatively, the application electronics 200 may be arranged to output a supply voltage and a data signal, in which case the gripper may comprise a controller to control the first motor 321 and the second motor 322, respectively, based on the data signal.

FIG. 9 shows an isometric view of a movable unit 20 having a switch-on unit 100 and a tool 300, wherein the tool 300 is configured as a vacuum lifter 330. The vacuum lifter 330 has a vacuum pump 331, a suction unit 332, and a tube 333, wherein the tube 333 connects the suction unit 332 to the vacuum pump 331. If a workpiece is in contact with the suction unit 332 and a vacuum is now generated at the suction unit 332 by the vacuum pump 331, the workpiece may be sucked in and is subsequently moved along with the movable unit 20.

The vacuum lifter 330 further comprises a holder 334, wherein the tube 333 is fixedly connected to the holder 334 near the suction unit 332. A lifting motor 335 is also arranged at a lifting frame 338, at which the vacuum pump 331 is arranged, as well. By the lifting motor 335, a threaded rod 336 may be set in rotation, wherein the threaded rod 336 engages in an internal thread of the holder 334. The holder 334 is spatially fixed by four parallel rods 337, which are also arranged parallel to the threaded rod 336, in such a way that only movement along the longitudinal axes of the rods is possible. If the threaded rod 336 is now set in rotation, a movement of the holder 334 and thus of the suction unit 332 parallel to the rods 337 is triggered, similar to the lifting movement of the gripper 310 by the second motor 322 already described in connection with FIGS. 6 to 8.

The vacuum pump 331 and the lifting motor 335 are also connected to the switch-on unit 100, but this connection is not visible due to the perspective of FIG. 9. The switch-on unit 100 of FIG. 9 may comprise application electronics 200, which are set up to output voltages for the vacuum pump 331 and the lifting motor 335. Alternatively, the application electronics 200 may be arranged to output a supply voltage and a data signal, in which case the vacuum lifter 330 may comprise a controller to control the lifting motor 335 and the vacuum pump 331, respectively, based on the data signal.

FIG. 10 shows an isometric view of a movable unit 20 having a switch-on unit 100 and a tool 300, wherein the tool 300 is configured as a rotation unit 340. The rotation unit 340 has a mounting plate 341, wherein a drive motor 342 is arranged on the mounting plate 341. On a side of the mounting plate 341 opposite to the drive motor 342, the drive motor 342 is connected to a first gear 343. The first gear 343 engage with a second gear 344, the second gear 344 having more teeth than the first gear 343. The second gear 344 is connected to a turntable 345, wherein a product 346 located on the turntable 345 may be rotated by a rotation of the turntable 345. The first gear 343 and the second gear 344 thereby form a reduction gear.

The drive motor 342 is connected to the switch-on unit 100 by a cable 302, the plug not being shown in FIG. 10 due to the perspective. The switch-on unit 100 of FIG. 10 may thereby comprise application electronics 200, which are set up to output voltages for the drive motor 342. Alternatively, the application electronics 200 may be set up to output a supply voltage and a data signal, in which case the rotation unit 340 may comprise a controller to control the drive motor 342 based on the data signal.

The tools 300 shown in FIGS. 6 to 10 are exemplary examples; other tools 300 that may be addressed by the switch-on unit 100 are also conceivable. Among other things, tools 300 may also comprise sensors and then be read out by an analog or digital readout unit of the switch-on unit 100. In particular, the application electronics 200 may be arranged to control a stepper motor and/or a servo motor and/or a DC motor of the tool 300. The first motor 321 or the second motor 322 of the gripper 310 may in particular be configured as a stepper motor or servo motor or DC motor. The vacuum pump 331 of the vacuum lifter 330 may in particular be a DC motor. The drive motor 342 of the rotation unit 340 may in particular be a stepper motor or servo motor or DC motor. Furthermore, the drive electronics 200 may be arranged to control a coil current for a coil of the tool 300 and/or to provide digital inputs and/or outputs and/or to provide analog inputs and/or outputs and/or to provide a communication interface and/or to provide an interface for rotary encoders or linear encoders. In particular, by a rotary encoder, e.g. rotary movements of first motor 321, second motor 322, hoist motor 335, and/or drive motor 342 may be detected so that more precise control of the first motor 321, the second motor 322, the lifting motor 335, and/or drive motor 342 is allowed for.

An example of one of the further tools 300 may be a container that may be tilted. To this end, it may be provided that the container is rotatably mounted about a container axis and may be rotated about the container axis by a threaded rod or by a spring mechanism. In this case, the container may be embodied in such a way that objects inside the container are tipped out of the container when the container is tilted accordingly. A rotation of the threaded rod or an actuation of the spring mechanism may in turn be controlled by the application electronics 200 of the switch-on unit 100.

In FIGS. 11 to 19, various electrical circuits for application electronics 200 for various tools 300 or for various sub-elements of tools 300 are shown. In particular, several of the circuits shown in FIGS. 11 to 19 may be combined to form an application electronics 200.

Each of FIGS. 11 to 19 depicts an application electronics 200. The application electronics includes connections 202 that may be used to connect the application electronics 200 to the first circuit board 120, and thus to the power supply and the communication link. An operating voltage 212 may be provided via the power supply, e.g. having a potential of twenty-four volts with respect to a ground 211. Further, a data communication 213 is provided, which may be used to pass data from the first circuit board 120 to a communication circuit 221. In this regard, the data communication 213 may include one or a plurality of data lines. Furthermore, the application electronics 200 comprises a power supply unit 222 that may be used to provide various required operating voltages. The communication circuit 221 is connected to a control element 223, wherein the control element 223 may e.g. comprise a microcontroller or a field programmable gate array (FPGA).

This structure is identical in all exemplary embodiments of the application electronics 200 shown in FIGS. 11 to 19, so that it will not be discussed again individually in the following description.

Figure 11:
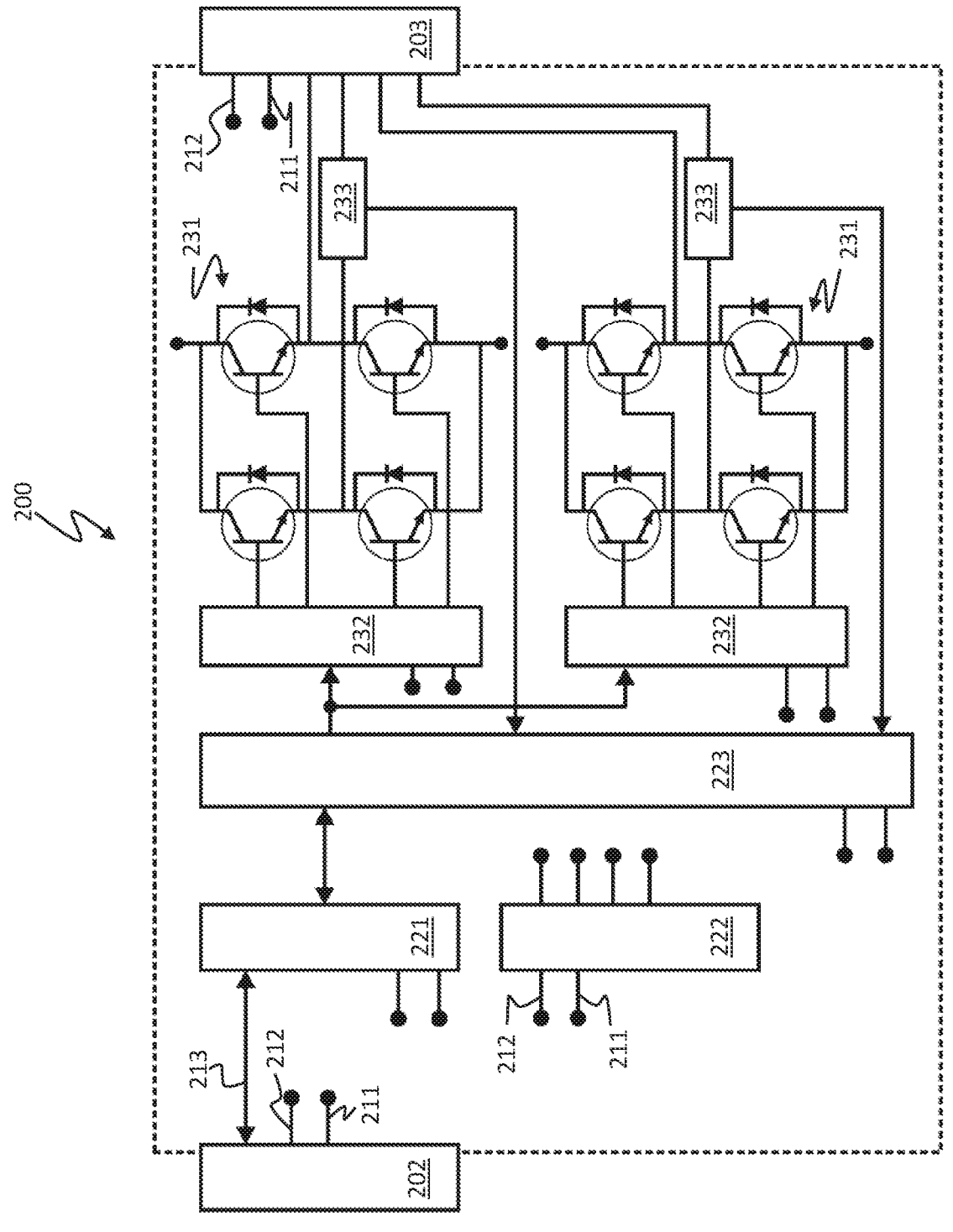

FIG. 11 shows an application electronics 200 that is used to control a stepper motor and thus e.g. the first motor 321, the second motor 322, the lifting motor 335 or the drive motor 342. Two power output stages 231, each comprising four npn transistors, are each controlled by a driver 232 and are each arranged to drive an inductor of the stepper motor via the second interface 203. A current feedback 233 to the control element 223 is used to control the power output stages 231. The application electronics 200 shown in FIG. 11 may be used to control a stepper motor. If a plurality of stepper motors are provided, e.g. in the gripper 310 of FIGS. 6 to 8, the application electronics 200 of FIG. 11 may be used, for example, to control the first motor 321 and the second motor 322 may be controlled by an identically constructed circuit, which may also be part of the control electronics 200.

The operating voltage 212 and the ground 211 are also provided at the second interface 203. In an alternative embodiment herein, another voltage, e.g. provided by the voltage supply unit 222, may be provided here, as well. Again, this also applies to the following figures.

Figure 12:
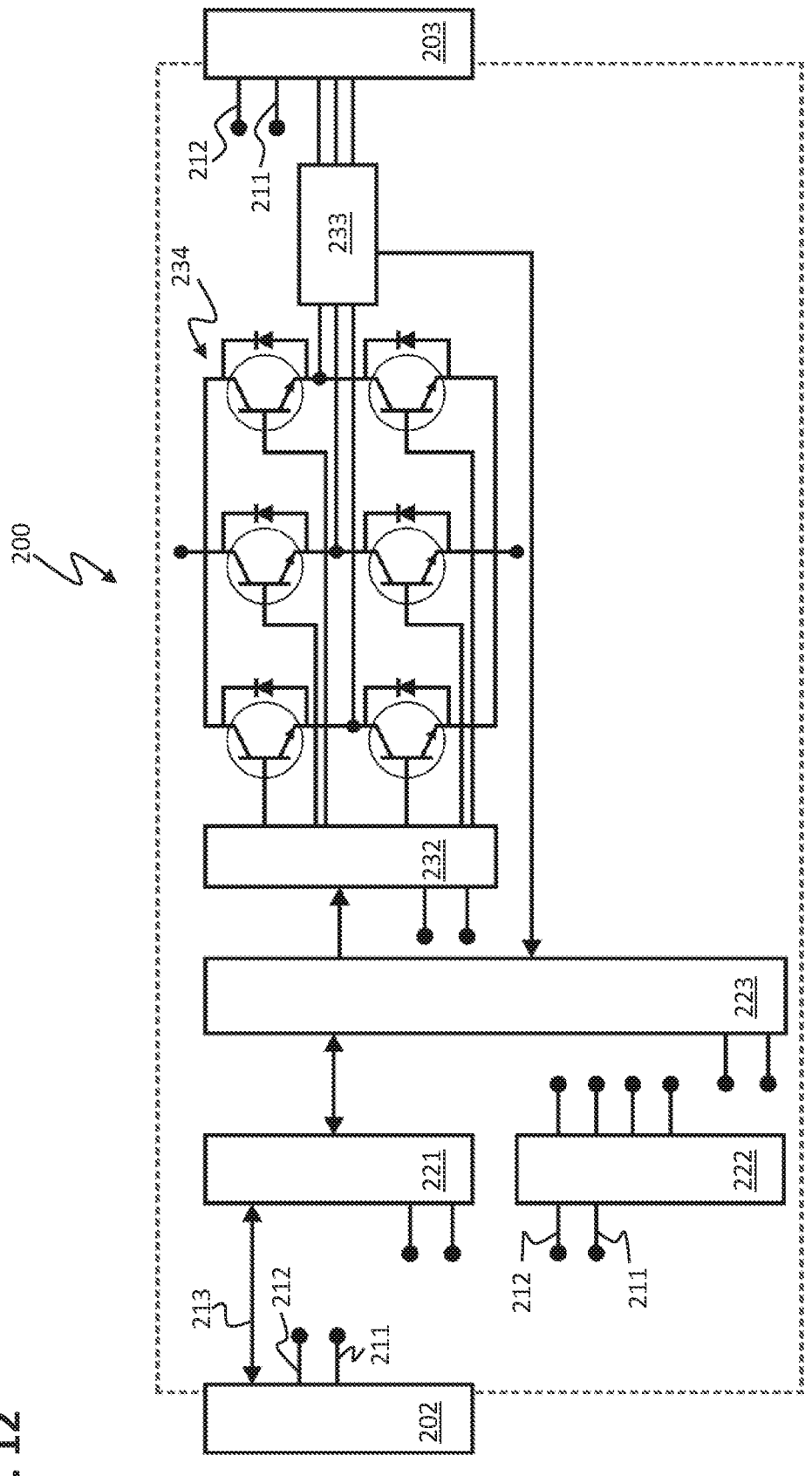

FIG. 12 shows an application electronics 200, which is used to control a three-phase servo motor or a brushless DC motor and thus e.g. the first motor 321, the second motor 322, the lifting motor 335 or the drive motor 342. With the aid of a driver 232, a three-phase control 234 is operated and connected to the tool by the second interface 203. In this case, a current feedback 233 is also provided to serve the control. In this case, the current feedback 233 may pass the currents of all three phases to the control element. Alternatively, the current feedback 233 may be used to measure two currents and calculate a third current, assuming that the sum of the currents is zero.

Figure 13:
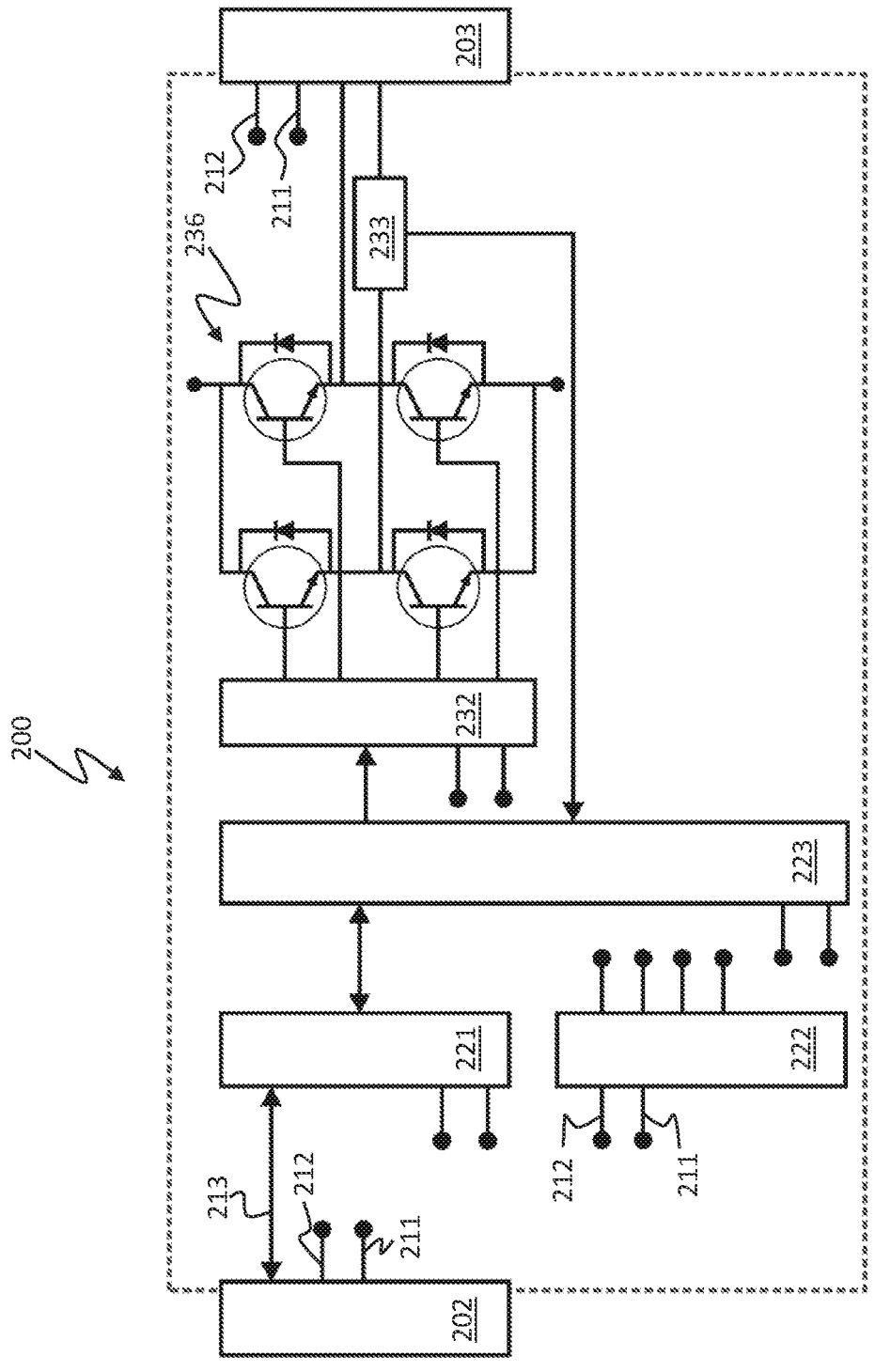

FIG. 13 shows an application electronics 200 that is used to control a coil. The application electronics have a coil control 236 that corresponds to one of the power output stages of the application electronics 200 of FIG. 11. Thus, an inductor may be driven. This is e.g. useful when the tool 300 includes an electromagnet with a coil that is to be controlled.

Figure 14:
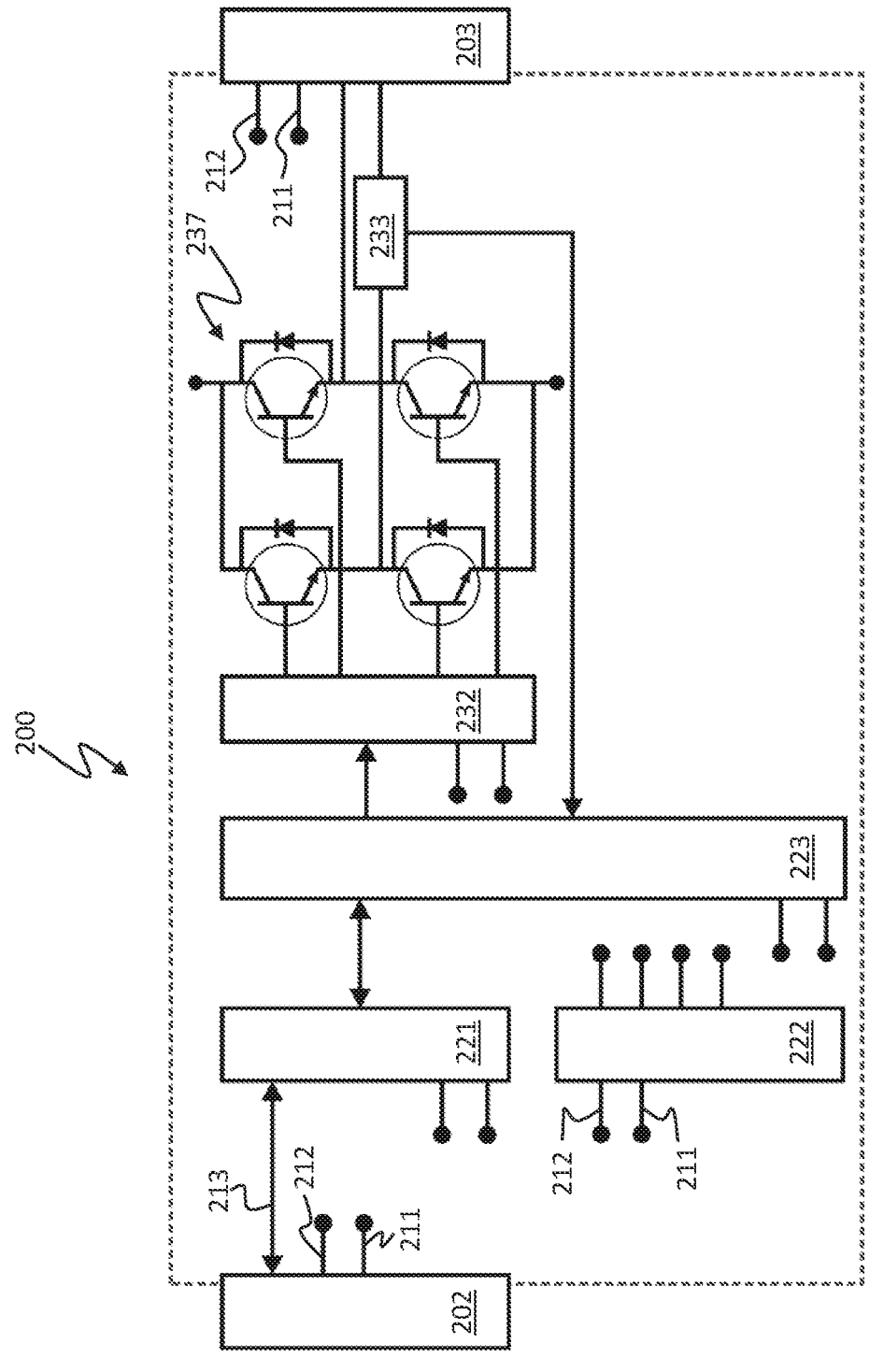

FIG. 14 shows an application electronics 200 that is used to control a DC motor and thus e.g. the first motor 321, the second motor 322, the lifting motor 335, the vacuum pump 331, or the drive motor 342. A driver 232 is used to operate a DC motor controller 237, which is connected to the DC motor by the second interface 203. In this regard, the DC motor control 237 is constructed in the same manner as the power output stage 231. For example, if the tool 300 is the vacuum lifter 330 of FIG. 9, this application electronics 200 may be used to operate the vacuum pump 331 if it comprises a DC motor. A circuit corresponding at least in part to the application electronics 200 of FIG. 11 may also be provided for the lifting motor 335. Both circuits may be combined to form application electronics 200 arranged on the second circuit board 201.

Figure 15:
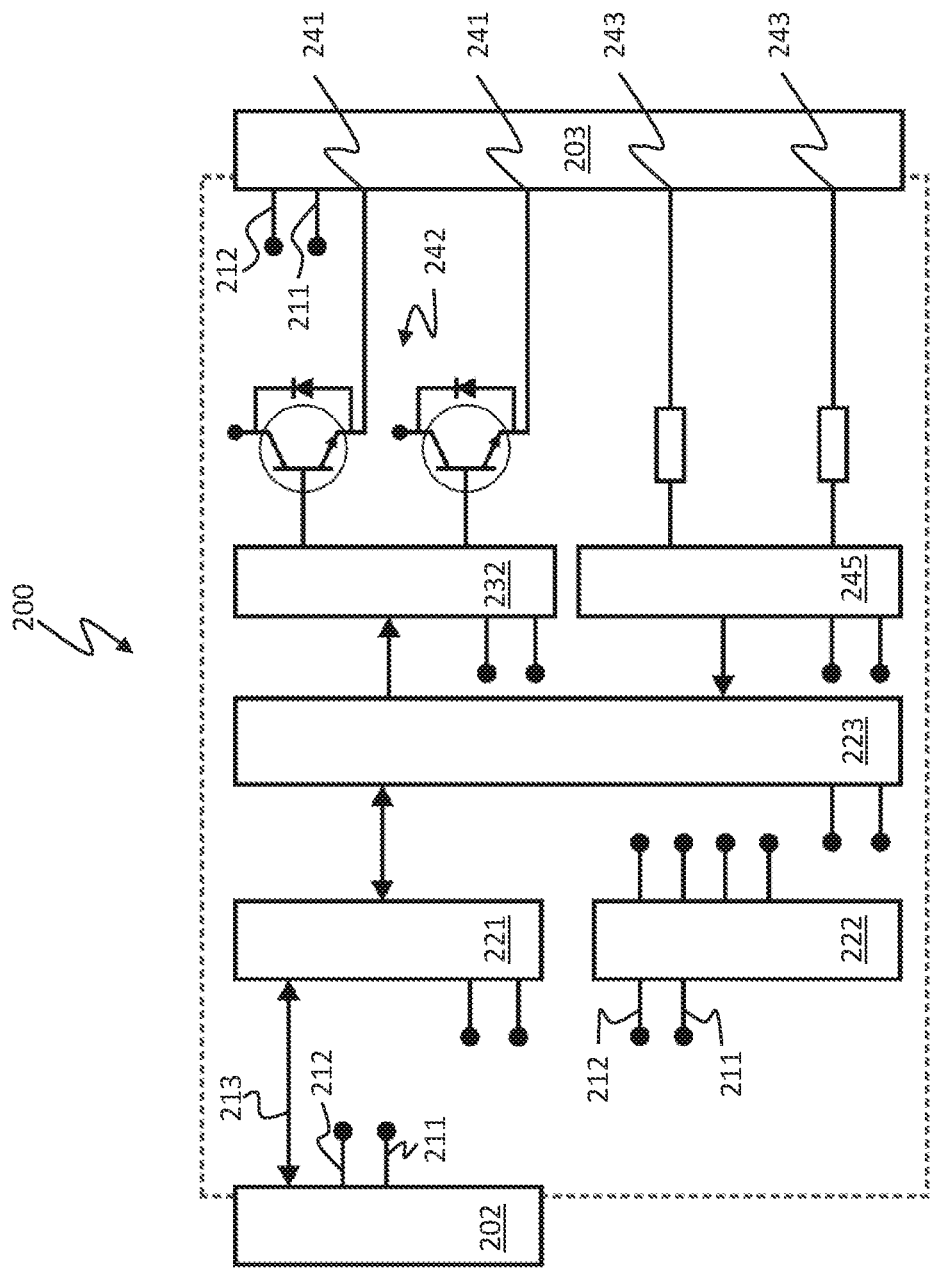

FIG. 15 shows an application electronics 200 via which digital signals may be output or read in. For this purpose, the second interface 203 has digital outputs 241 that may be controlled by the driver 232 and a transistor circuit 242. In addition, the second interface 203 comprises digital inputs 243 that may be read out by a reading unit 245. Two digital outputs 241 and two digital inputs 243 are shown, respectively, but the number may be different.

Figure 16:
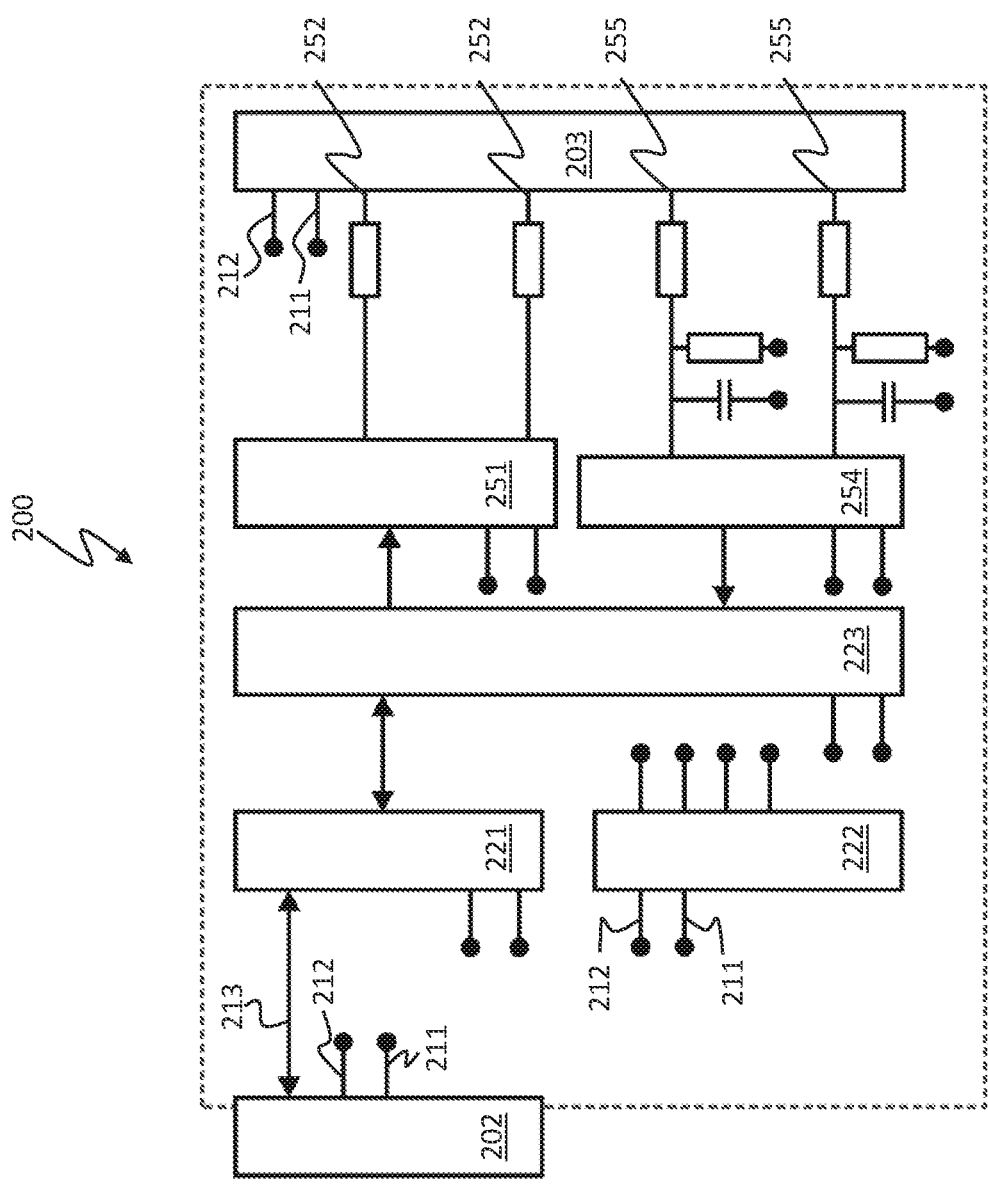

FIG. 16 shows the application electronics 200 that may be used to output or read in analog signals. For this purpose, the second interface 203 has two analog outputs 252 that may be controlled by an analog output control 251. Furthermore, the second interface 203 has two analog inputs 255 that may be read out by an analog readout unit 254. Two analog outputs 252 and two analog inputs 255 are shown respectively, but the number may be different.

Figure 17:
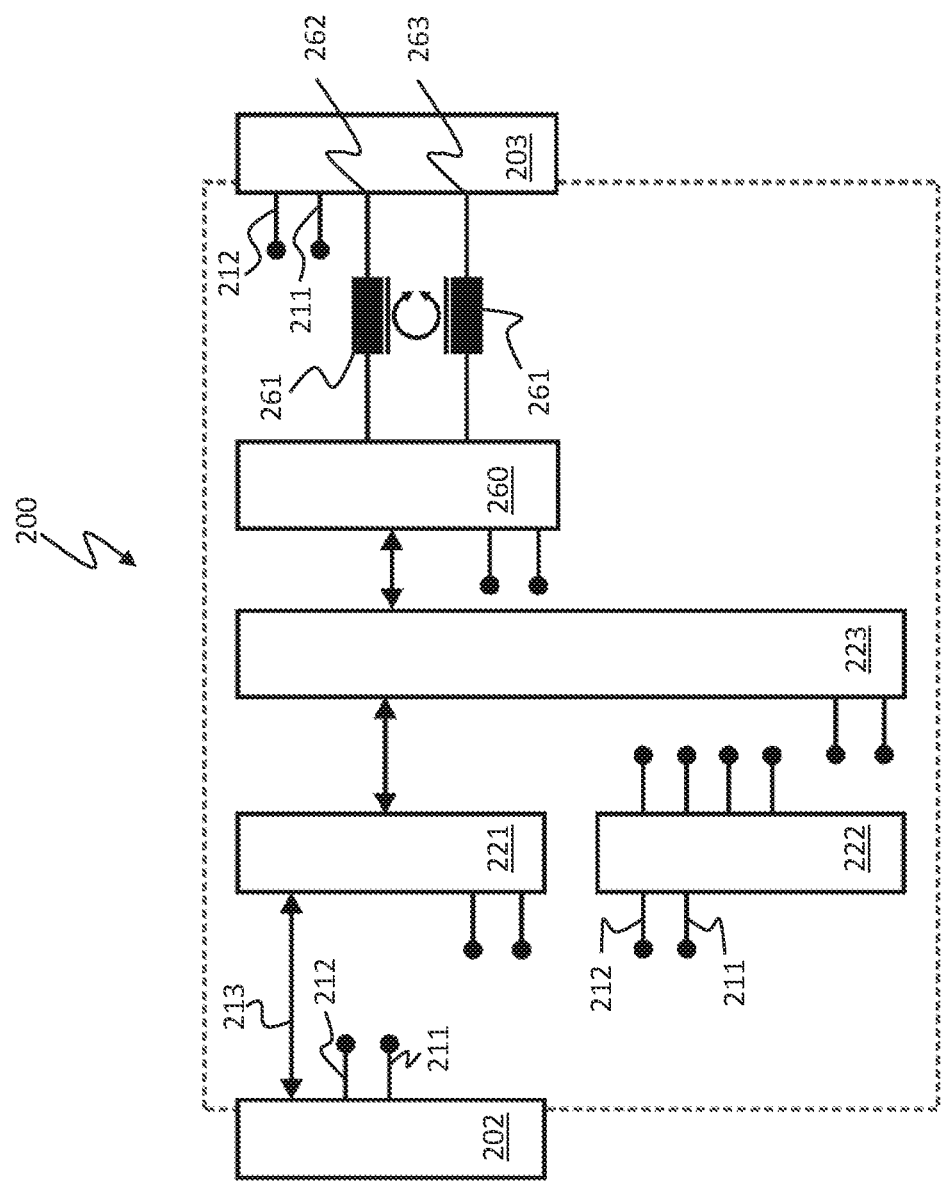

FIG. 17 shows an application electronics 200 that allows digital communication to the tool 300. A communication converter 260 is connected to a TX port 262 of the second interface 203 and an RX port 263 of the second interface 203 by current-compensated chokes 261. Thus, a data signal defined by a data protocol may be output to the tool 300 via the second interface 203.

Figure 18:
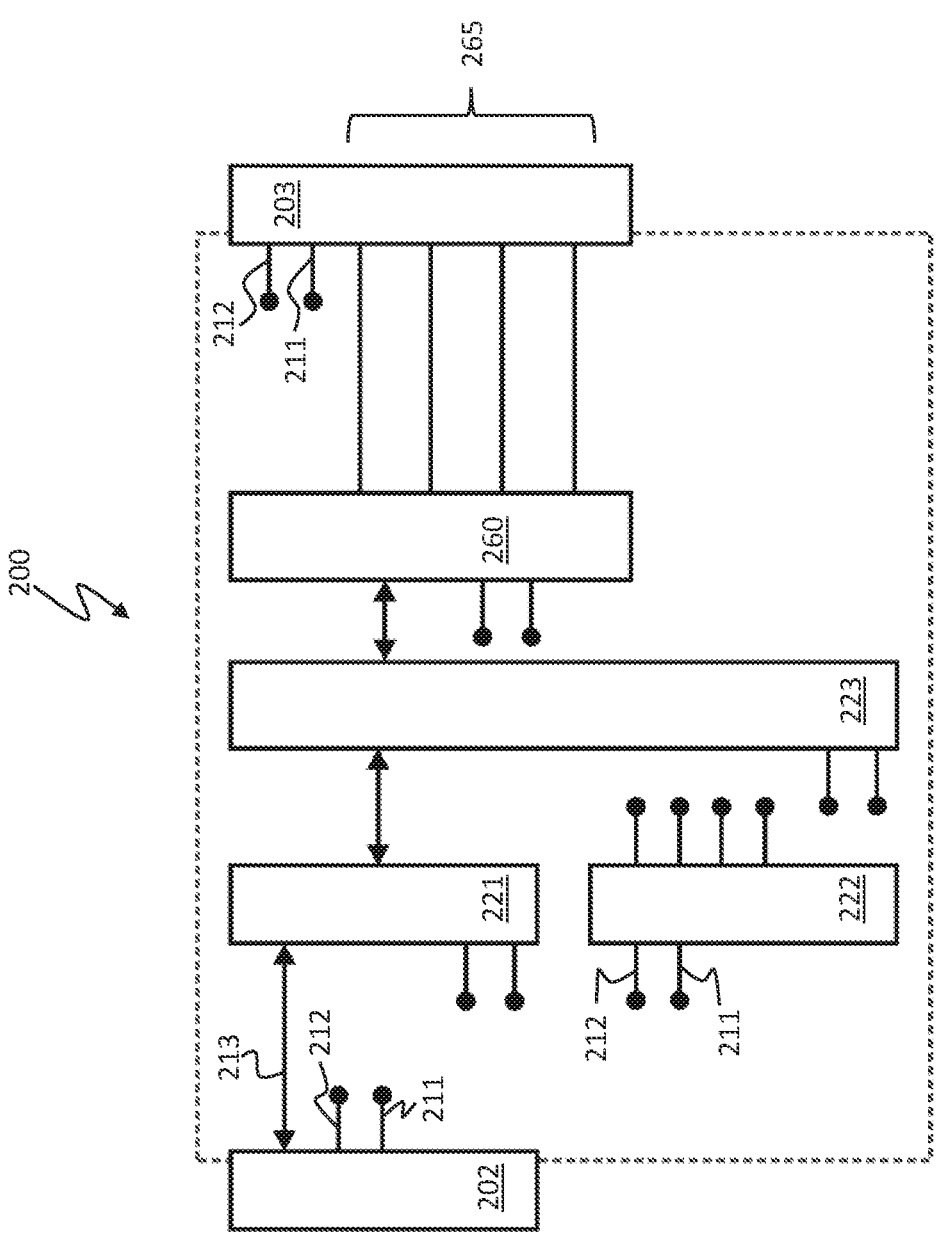

FIG. 18 shows an application electronics 200 that allows for digital communication to the tool 300. A communication converter 260 is connected to four communication ports 265 of the second interface 203. Thus, a data signal defined by a data protocol may be output to the tool 300 via the second interface 203. The application electronics 200 shown in FIGS. 17 and 18 represent alternatives with regard to one another.

Figure 19:
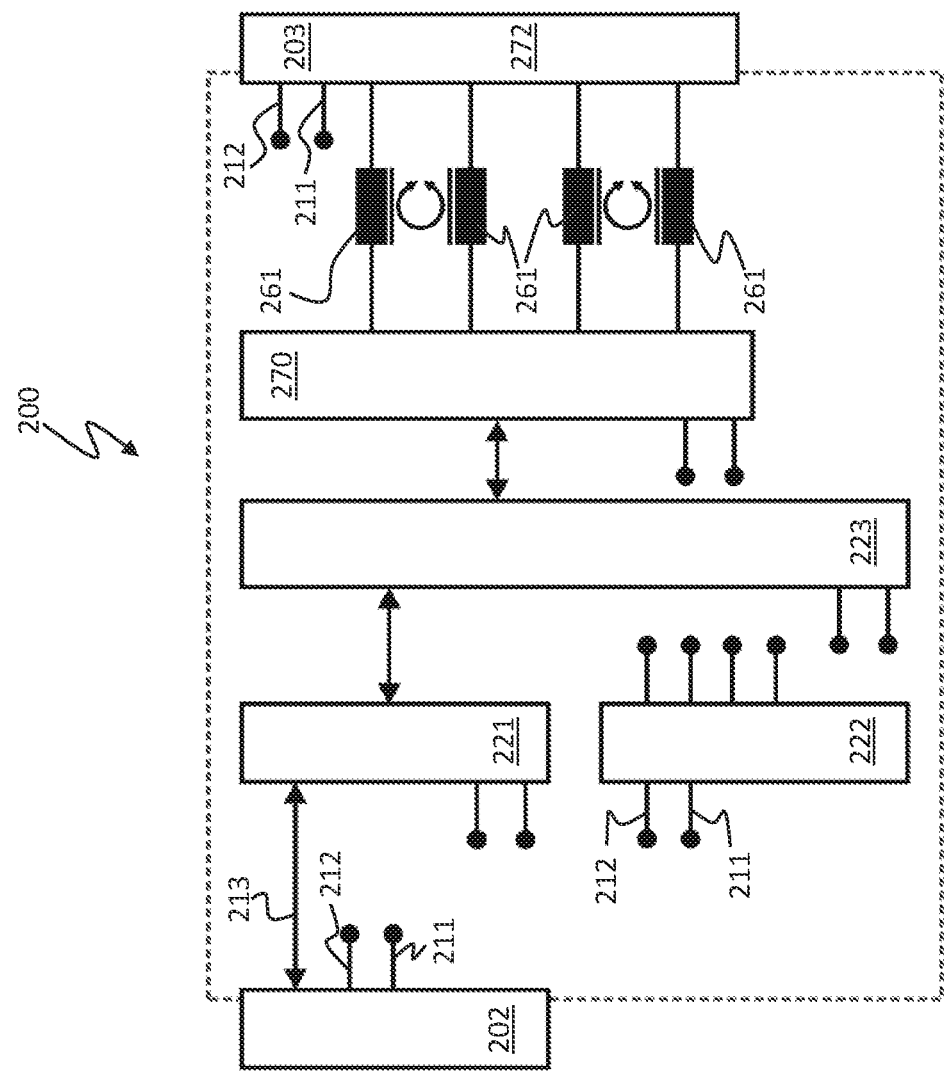

FIG. 19 shows an application electronics 200 that may be used to read out an encoder of the tool 300. An encoder control 270 is connected to an encoder interface 272, which is part of the second interface 203, via four current-compensated chokes 261. Such application electronics may be used to read an encoder, such as a rotary encoder or a linear encoder.

Such an application electronics 200 may be combined with one of the motor application electronics 200 already described to read out a motor position. The encoder control 270 may also be referred to as an encoder interface. Other application electronics 200 herein are conceivable, as well.

TABLE 1

| List of reference numerals 1-237 |
| --- |
| 1 linear transport system |
| 2 stationary unit |
| 3 guide rail |
| 4 linear motor |
| 5 stator |
| 6 stationary antenna |
| 7 energy-emitting coil |
| 8 curved module unit |
| 20 movable unit |
| 21 rotor |
| 22 magnet |
| 23 fastening option |
| 24 track roller |
| 25 frame |
| 99 screw |
| 100 switch-on unit |
| 101 housing |
| 102 first extension direction |
| 103 second extension direction |

TABLE 1-continued

| List of reference numerals 1-237 |
| --- |
| 105 energy-receiving coil |
| 106 ferromagnetic core |
| 110 movable antenna |
| 111 coil board |
| 120 first circuit board |
| 121 energy-receiving electronics |
| 122 communication electronics |
| 123 connection |
| 124 first interface |
| 130 installation space |
| 140 computing unit |
| 141 memory |
| 142 further memory |
| 143 internal memory |
| 144 internal energy storage |
| 181 first direction of extension |
| 182 second direction of extension |
| 183 first region |
| 184 second region |
| 190 opening |
| 191 plug-in element |
| 200 application electronics |
| 201 second circuit board |
| 202 connections |
| 203 second interface |
| 211 ground |
| 212 operating voltage |
| 213 data communication |
| 221 communication circuit |
| 222 voltage supply unit |
| 223 control element |
| 231 power output stage |
| 232 driver |
| 233 current feedback |
| 234 three-phase control |
| 236 coil control |
| 237 direct current motor control |

TABLE 2

| List of reference numerals 241-346 |
| --- |
| 241 digital output |
| 243 digital input |
| 245 reading unit |
| 251 analog output control |
| 252 analog output |
| 254 analog readout unit |
| 255 analog input |
| 260 communication converter |
| 261 current-compensated choke |
| 262 Tx connection |
| 263 Rx connection |
| 265 communication connections |
| 270 encoder control |
| 272 encoder interface |
| 300 tool |
| 301 plug |
| 302 cable |
| 310 gripper |
| 311 first gripper shell |
| 312 second gripper shell |
| 313 first motion converter |
| 314 second motion converter |
| 315 first axis bar |
| 316 second axis rod |
| 317 gripper frame |
| 321 first motor |
| 322 second motor |
| 323 conic body |
| 324 threaded rod |
| 325 lifting unit |
| 330 vacuum lifter |
| 331 vacuum pump |
| 332 suction unit |

15

TABLE 2-continued

List of reference numerals 241-346

| | |
|---|---|
| 333 | tube |
| 334 | holder |
| 335 | lifting motor |
| 336 | threaded rod |
| 337 | rod |
| 338 | lifting frame |
| 340 | rotation unit |
| 341 | mounting plate |
| 342 | drive motor |
| 343 | first gear |
| 344 | second gear |
| 345 | turntable |
| 346 | product |

The invention claimed is:

1. A switch-on unit for a tool of a movable unit of a linear transport system, wherein the switch-on unit is configured for fastening to the movable unit, wherein the switch-on unit comprises a housing, wherein the switch-on unit comprises an energy-receiving coil having energy-receiving electronics and a movable antenna having communication electronics, wherein the energy-receiving electronics and the communication electronics are arranged at least a first circuit board within the housing, wherein the housing comprises an opening for connections of the tool, wherein the housing comprises an installation space for an application electronics, wherein the first circuit board comprises a first interface for the application electronics with a voltage supply and a communication link, and wherein the communication electronics are configured to receive a first data signal via the movable antenna, to calculate a second data signal from information about a data structure of the first data signal and the first data signal, and to provide the second data signal at the communication link;

wherein the switch-on unit is arranged to control a receipt of the first data signal based on the data structure and to calculate the second data necessary for a transmission to the tool based on the data structure.

2. The switch-on unit according to claim 1, wherein the energy-receiving electronics are configured to convert an AC voltage received via the energy-receiving coil into a DC voltage provided via the power supply.

3. The switch-on unit according to claim 2, wherein the energy-receiving electronics are arranged to regulate the DC voltage to a predetermined value.

4. A movable unit of a linear transport system comprising a switch-on unit according to claim 1, and further comprising:

a fastening option for a tool, wherein the movable unit comprises track rollers, wherein the track rollers are configured to roll off on a guide rail of the linear transport system, wherein the movable unit comprises a frame, wherein the track rollers are arranged at the frame, and wherein the fastening option is attached to the frame.

5. The movable unit according to claim 4, wherein the tool is attached to the fastening option, and wherein the tool is connected to the switch-on unit.

6. A linear transport system comprising a movable unit according to claim 4, wherein the linear transport system further comprises:

a guide rail for guiding the movable unit, a plurality of stationary units, and a linear motor for driving the movable unit along the guide rail, wherein the linear motor comprises a stator and a rotor, wherein the stator comprises the stationary units, each comprising one or a plurality of drive coils, wherein the rotor is arranged on the movable unit and comprises one or a plurality of magnets, and wherein at least some of the stationary units each comprise one or a plurality of energy-emitting coils and one or a plurality of stationary antennas.

7. A switch-on unit for a tool of a movable unit of a linear transport system, wherein the switch-on unit is configured for fastening to the movable unit, wherein the switch-on unit comprises a housing, wherein the switch-on unit comprises an energy-receiving coil having energy-receiving electronics and a movable antenna having communication electronics, wherein the energy-receiving electronics and the communication electronics are arranged at at least a first circuit board within the housing, wherein the housing comprises an opening for connections of the tool, wherein the housing comprises an installation space for an application electronics, wherein the first circuit board comprises a first interface for the application electronics with a voltage supply and a communication link, and wherein the communication electronics are configured to receive a first data signal via the movable antenna, to calculate a second data signal from information about a data structure of the first data signal and the first data signal, and to provide the second data signal at the communication link;

wherein application electronics are arranged in the installation space, wherein the application electronics comprise connections for connecting the application electronics to the first interface, wherein the application electronics comprise a second interface for a tool connection, wherein the second interface is arranged in the opening of the housing.

8. The switch-on unit according to claim 7, wherein the application electronics are arranged to process the second data signal and to provide at least a voltage and/or data at the second interface based on the second data signal and/or to read data at the second interface based on the second data signal.

9. The switch-on unit according to claim 7, wherein the application electronics are arranged on at least a second circuit board.

10. The switch-on unit according to claim 7, wherein the second interface comprises a plug element, wherein the plug element tightly seals the opening.

11. The switch-on unit according to claim 10, wherein the housing is cast with a curing fluid.

12. The switch-on unit according to claim 7, wherein the application electronics are configured to control a stepper motor and/or a servo motor and/or a DC motor of the tool and/or to control a coil current for a coil of the tool and/or to provide digital inputs and/or outputs and/or to provide analog inputs and/or outputs and/or to provide a communication interface and/or to provide an interface for rotary encoders or linear encoders.

13. A switch-on unit for a tool of a movable unit of a linear transport system, wherein the switch-on unit is configured for fastening to the movable unit, wherein the switch-on unit comprises a housing, wherein the switch-on unit comprises an energy-receiving coil having energy-receiving electronics and a movable antenna having communication electronics, wherein the energy-receiving electronics and the communication electronics are arranged at at least a first circuit board within the housing, wherein the housing comprises an opening for connections of the tool, wherein the housing comprises an installation space for an application electronics, wherein the first circuit board comprises a first interface for the application electronics with a voltage supply and a communication link, and wherein the communication electronics are configured to receive a first data signal via the movable antenna, to calculate a second data signal from information about a data structure of the first data signal and the first data signal, and to provide the second data signal at the communication link;

wherein the housing is larger in a first extension direction than in a second extension direction, wherein the housing comprises a first region and a second region, wherein the housing is larger in the first region than in the second region in the second direction of extension, wherein the energy-receiving coil and the movable antenna are arranged in the first region, wherein the at least one first circuit board and the installation space extend over the first region and the second region.

14. The switch-on unit according to claim 13, wherein the housing is at least partially made of a metal.

15. A switch-on unit for a tool of a movable unit of a linear transport system, wherein the switch-on unit is configured for fastening to the movable unit, wherein the switch-on unit comprises a housing, wherein the switch-on unit comprises an energy-receiving coil having energy-receiving electronics and a movable antenna having communication electronics, wherein the energy-receiving electronics and the communication electronics are arranged at at least a first circuit board within the housing, wherein the housing comprises an opening for connections of the tool, wherein the housing comprises an installation space for an application electronics, wherein the first circuit board comprises a first interface for the application electronics with a voltage supply and a communication link, and wherein the communication electronics are configured to receive a first data signal via the movable antenna, to calculate a second data signal from information about a data structure of the first data signal and the first data signal, and to provide the second data signal at the communication link;

and further comprising a memory, wherein the memory is large enough to store firmware of the switch-on unit, and wherein the switch-on unit is configured to receive a data packet, wherein the switch-on unit is configured to perform a firmware update of the switch-on unit upon receipt of the data packet;

wherein the computing unit of the switch-on unit contains a special bootloader for executing the firmware update, wherein the bootloader configured for reading the firmware from the memory and to subsequently overwrite the firmware of the computing unit, wherein the switch-on unit is configured, after receipt of the data packet which initiates a process of updating the firmware, to at first completely receive the firmware, wherein a corresponding number of data packets for transmitting the firmware are at first received and after the switch-on unit has received all data packets for the firmware and has completely taken those over in an internal memory, the switch-on unit is configured to check whether enough energy is available in an internal energy memory so that the firmware update is executable without interruption, and wherein the switch-on unit is configured to set its bootloader into a corresponding mode for updating the firmware and is configured to subsequently re-boot itself, wherein the bootloader is configured to take over the updating process and to re-boot the computing unit after the update.

16. A switch-on unit for a tool of a movable unit of a linear transport system, wherein the switch-on unit is configured for fastening to the movable unit, wherein the switch-on unit comprises a housing, wherein the switch-on unit comprises an energy-receiving coil having energy-receiving electronics and a movable antenna having communication electronics, wherein the energy-receiving electronics and the communication electronics are arranged at at least a first circuit board within the housing, wherein the housing comprises an opening for connections of the tool, wherein the housing comprises an installation space for an application electronics, wherein the first circuit board comprises a first interface for the application electronics with a voltage supply and a communication link, and wherein the communication electronics are configured to receive a first data signal via the movable antenna, to calculate a second data signal from information about a data structure of the first data signal and the first data signal, and to provide the second data signal at the communication link;

wherein the switch-on unit further comprises a further memory, wherein the further memory is large enough to store firmware of the application electronics and wherein the switch-on unit is arranged to receive a further data packet, wherein the switch-on unit is arranged to perform a firmware update of the application electronics upon receipt of the further data packet;

wherein the switch-on unit is configured to store the firmware of the switch-on unit or the application electronics into an internal memory, and wherein the switch-on unit is configured to subsequently check the received firmware for validity.

* * * * *